United States Patent [19]

Hornung

[11] Patent Number: 4,788,398

[45] Date of Patent: Nov. 29, 1988

[54] TEMPERATURE SENSOR FAILURE DETECTION ARRANGEMENT USING A HEATER ENERGY COUNTER

[75] Inventor: Richard E. Hornung, Louisville, Ky.

[73] Assignee: General Electric Company, Louisville, Ky.

[21] Appl. No.: 103,051

[22] Filed: Sep. 30, 1987

[51] Int. Cl.$^4$ .............................................. H05B 1/02
[52] U.S. Cl. .................... 219/483; 219/448; 219/497; 219/506; 340/589
[58] Field of Search .............. 219/483, 486, 448, 492, 219/494, 506, 501, 497, 507, 508–509, 440–442; 307/38–41; 323/235, 319; 340/588, 589, 584

[56] References Cited

U.S. PATENT DOCUMENTS

| | | | |
|---|---|---|---|
| 4,241,289 | 12/1980 | Bowling | 219/450 |
| 4,443,690 | 4/1984 | Payne et al. | 219/486 |
| 4,493,980 | 1/1985 | Payne et al. | 219/450 |
| 4,551,618 | 11/1985 | Payne | 219/510 |
| 4,634,843 | 1/1987 | Payne | 219/486 |
| 4,639,578 | 1/1987 | Payne | 219/450 |

*Primary Examiner*—M. H. Paschall
*Attorney, Agent, or Firm*—H. Neil Houser; Radford M. Reams

[57] ABSTRACT

An improved temperature sensor failure detection arrangement for a temperature controlled heating device of the type having a heater, an electronic controller for controlling the power level applied to the heater, and a temperature sensor. The controller includes an internal heater energy counter, which is incremented and decremented at rates determined as a function of the power level applied to the heater such that the count of the heater energy counter approximately tracks the temperature of the heater. The controller periodically compares temperature information from the temperature sensor with the count of the heater energy counter to check for abnormal operating condition of the temperature sensor. An abnormal condition is detected when the count of the heater energy counter is within a predetermined reference range and the sensed temperature is outside a correlative predetermined reference temperature range, which ranges are selected such that under normal operating conditions, whenever the count is within the predetermined range, the temperature will be within the reference temperature range.

10 Claims, 13 Drawing Sheets

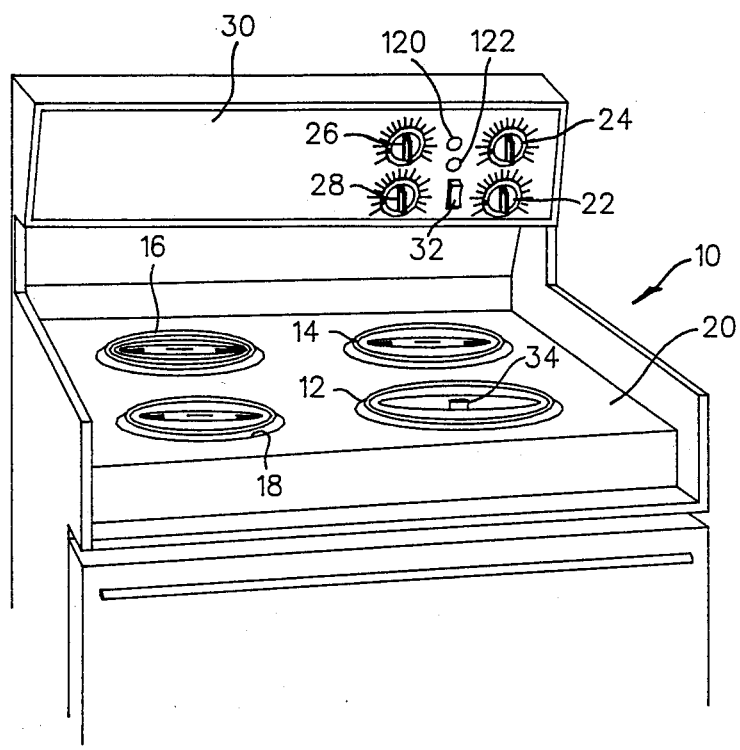
FIG. 1
FIG. 2
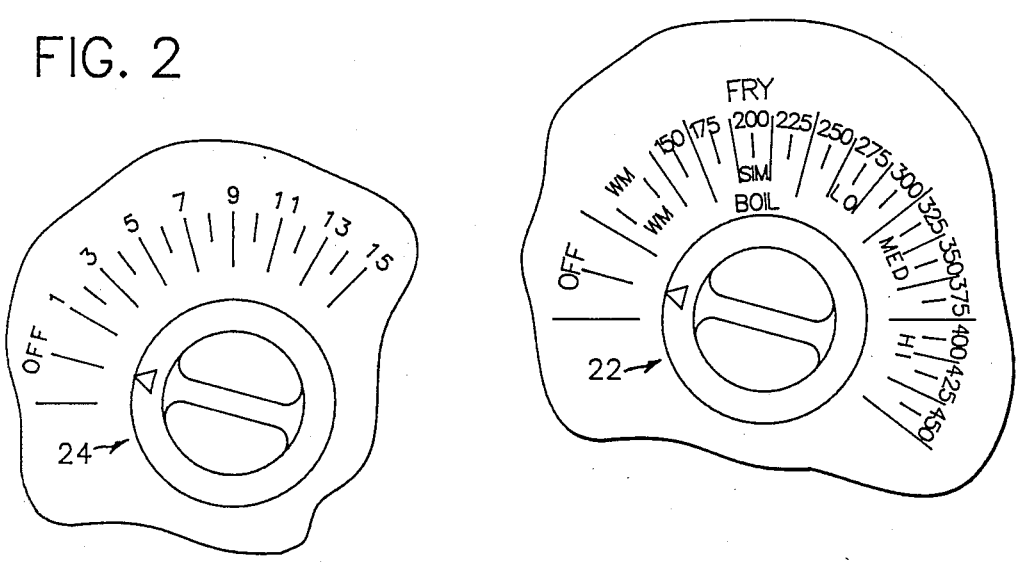
FIG. 2A
FIG. 3A
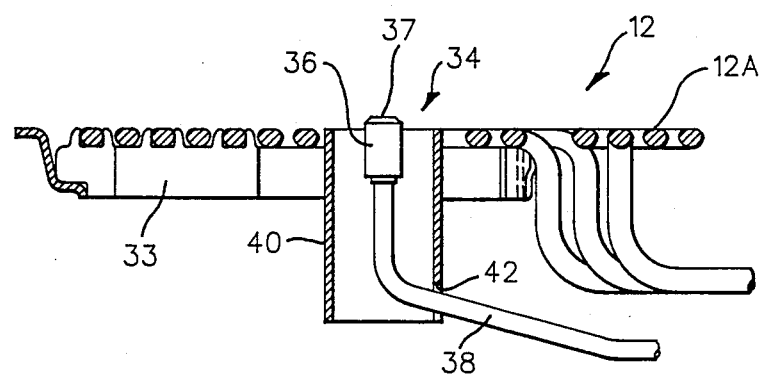

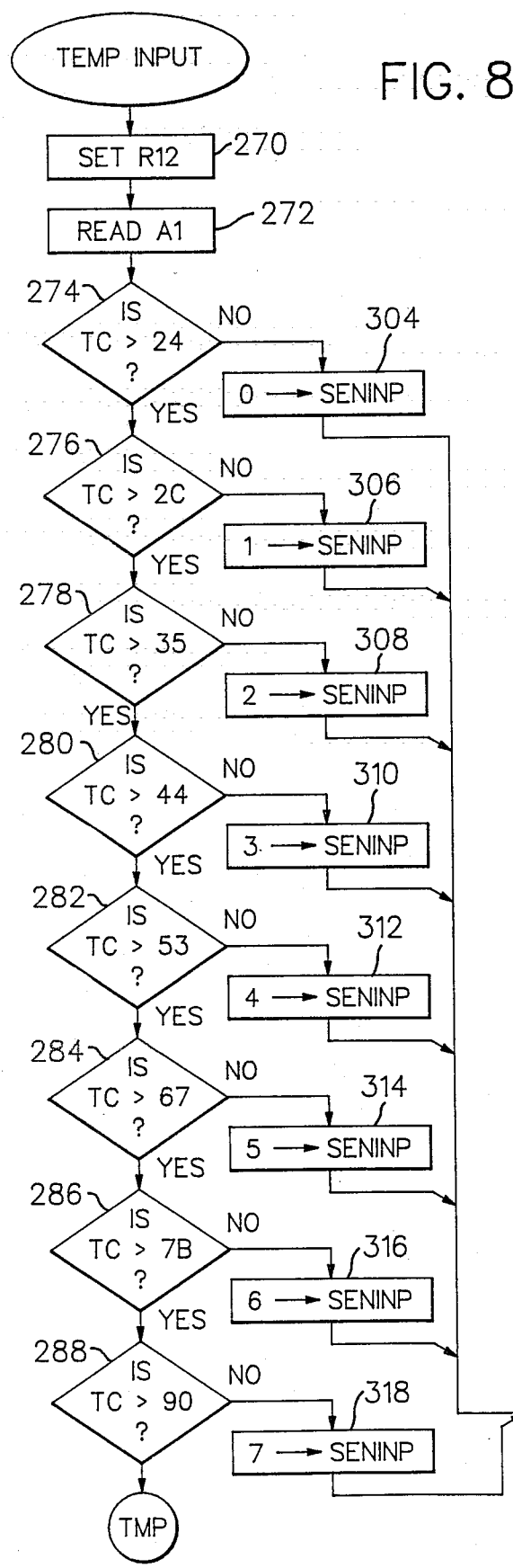
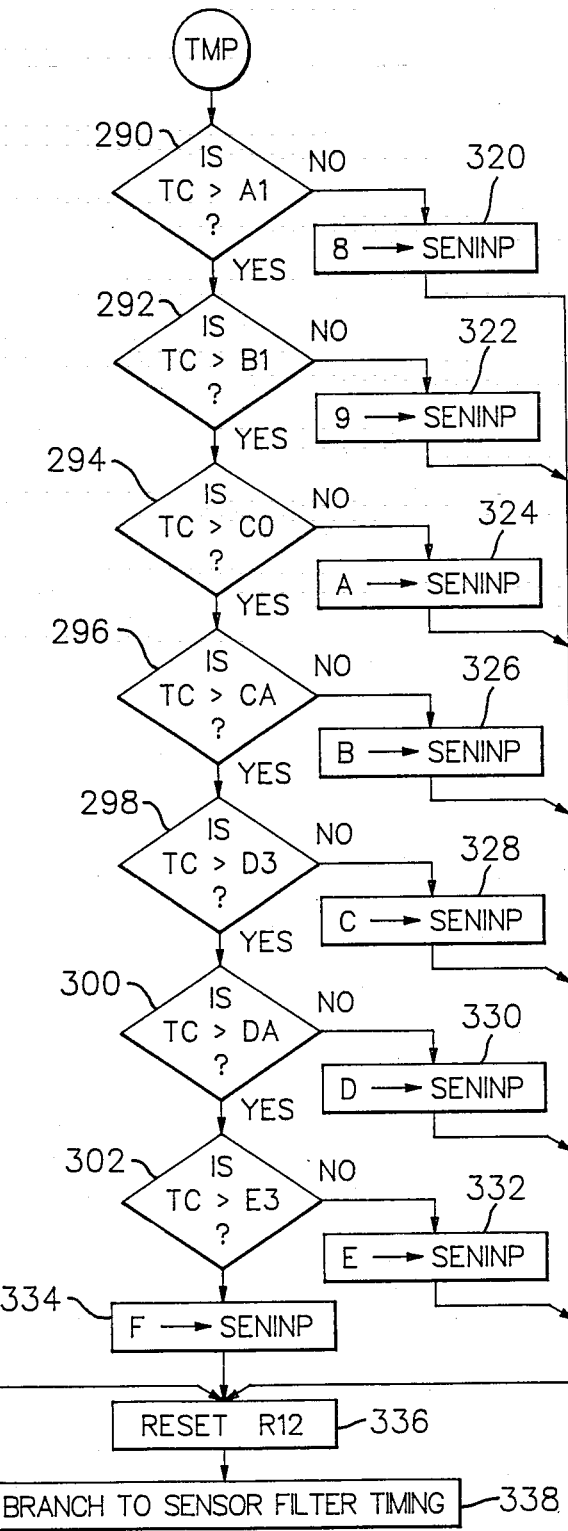
FIG. 8

TEMPERATURE SENSOR FAILURE DETECTION ARRANGEMENT USING A HEATER ENERGY COUNTER

BACKGROUND OF THE INVENTION

This invention relates generally to temperature controlled heating devices and more particularly to method and apparatus for detecting temperature sensor failure in such devices.

One well known type of temperature controlled heating device is the automatic surface unit used in cooking appliances such as cooktops and ranges. An automatic surface unit is equipped with a temperature sensor for sensing the temperature of the utensil being heated by the surface unit and a controller for controlling the energization of the surface unit as a function of the sensed utensil temperature. Such surface units are well known in the art and typically include a temperature sensing device such as a bimetallic device or a thermistor device mounted to be in thermal contact with the utensil. When the sensed temperature is less than the predetermined threshold temperature set by user manipulation of input control knobs or switches mechanically coupled to the sensing device, the heating unit is energized at full power. When the temperature exceeds the threshold, the unit is de-energized. An electronic control system for an automatic surface unit in which the electromechanical sensing and control devices are replaced by a microprocessor based control arrangement is described in commonly assigned U.S. Pat. No. 4,493,980 which is hereby incorporated by reference.

A problem common to both the electromechanical and electronic temperature sensing arrangements for automatic surface units is that a failure in the sensor circuitry typically results in either the surface unit being operated at full power continuously or being totally de-energized. The user, being unaware of this failure, may be greatly inconvenienced by either overheating or underheating a utensil.

One solution to this problem is disclosed in commonly assigned U.S. Pat. No. 4,639,578. In this arrangement the sensed temperature is periodically compared to a minimum reference temperature lower than normal operating temperature for the lowest operating power level and compared to a maximum reference temperature higher than the normal operating temperature for the highest operating power level. If the sensed temperature is less than the minimum for a period of time greater than a predetermined time to allow for normal transient conditions or higher than the maximum for a predetermined period of time, also to allow for transient conditions, a sensor failure is detected, a user discernible signal indicative of the malfunction of the sensor is generated, and the surface unit is then usable as a standard non-automatic surface unit until the malfunction is corrected. This arrangement reliably detects sensor failures. However, use of this arrangement requires that the analog to digital (A/D) converter circuitry used to convert the sensor signal from analog to digital form for input to the microprocessor programmed to control the surface unit have an operating range which is significantly greater than the range of interest for temperature control. Better temperature control performance can be achieved at less cost using an A/D converter circuit with a range which is more narrowly limited relative to the desired temperature control range. However, actual utensil temperatures, even under normal operating conditions, may be above or below the control range for relatively long periods of time. Thus, when an A/D converter with a range limited to the actual control range is used for temperature sensing, reliance strictly on the temperature signals to detect sensor failures will result in frequent false detects.

Therefore, a need exists for an arrangement which reliably detects temperature sensor failures compatible with control systems in which the range of the temperature sensing system is essentially limited to the control range defined by the maximum and minimum threshold temperatures used for normal temperature control decisions.

It is therefore an object of the present invention to provide an improved sensor fault detection arrangement for use in temperature controlled heating devices in which the range of the temperature sensing system is essentially limited to a control range defined by maximum and minimum threshold temperatures used for normal temperature control decisions. 10 It is a further object of the present invention to provide an improvement to the fault detection arrangement of U.S. Pat. No. 4,639,578, which permits use of a narrower range A/D converter circuit.

It is a further object to provide the foregoing improvement without additional circuitry external to the microprocessor.

SUMMARY OF THE INVENTION

An improved temperature sensor failure detection arrangement is provided for a temperature controlled heating device of the type having heater means, control means for controlling the power level applied to the heater means, and temperature sensing means for sensing the temperature of a load heated by the heater means. In accordance with a broader aspect of the invention, the control means includes heater energy counter means, and means for controlling the incrementing and decrementing the heater energy counter means at rates determined as a function of the power level applied to the heater means such that the count of the heater energy counter approximately tracks the temperature of the heater means. The control means, further includes means responsive to the temperature sensing means and the heater energy counter means, operative to detect an abnormal operating condition of the temperature sensing means when the count of the heater energy counter is within a predetermined reference range and the sensed temperature is outside a correlative predetermined reference temperature range.

The reference count range and correlative reference temperature range are selected such that under normal operating conditions, whenever the count is within the predetermined count range, the temperature will be within the reference temperature range. Thus, if this condition is not satisfied, a temperature sensor failure is indicated.

In a preferred form of the invention, an improved temperature sensor failure detect arrangement is provided for a cooking appliance of the type having heater means for heating a cooking utensil, user input selection means for enabling the user to select the desired heating level for the heating means, temperature sensing means operative to sense the temperature of the utensil being heated by the heater means, and control means responsive to the user input selection means and the temperature sensing means operative under normal conditions to apply a power level to the heating unit as a function of the user selected heating level and the sensed utensil temperature. The appliance also includes heater energy counter means for approximately tracking the temperature of the heater means, and counter control means to selectively increment and decrement the heater energy counter at rates such that the count of the heater energy counter is approximately proportional to the temperature of the heater means during the heat up, steady state and cool down phases of the heater operation.

In accordance with this form of the invention, the control means includes means responsive to the heater energy counter means and the temperature sensing means for detecting an abnormal operating condition of the temperature sensing means when the count of the counter is within a predetermined reference range and the sensed utensil temperature is outside a correlative predetermined reference temperature range, and means for generating a user discernible signal upon such detection to signify to the user that the abnormal operating condition of the sensor means has been detected. Upon detection of such a failure the control means de-energizes the heater means.

The temperature sensing means preferably comprises a thermistor and the fault detection arrangement distinguishes between a first abnormal condition corresponding to an open circuit failure and a second diagnostic condition corresponding to a short circuit failure. The first abnormal condition is detected when the count of the heater energy counter is less than a high diagnostic rference count and the sensed temperature is greater than a correlative predetermined diagnostic maximum reference temperature. The second fault condition is detected when the count of the heater energy counter is greater than a predetermined low diagnostic reference count and the sensed utensil temperature is less than a correlative predetermined minimum reference diagnostic temperature.

While the novel features of the invention are set forth with particularity in the appended claims, the invention both as to organization and content will be better understood and appreciated from the following detailed description taken in conjunction with the drawings.

BRIEF DESCRIPTION OF THE DRAWINGS

FIG. 1 is a front perspective view of a portion of an electric range illustratively embodying the sensor failure detection arrangement of the present invention;

FIGS. 2A and 2B are greatly enlarged views of a portion of the control panel of the range of FIG. 1 showing the details of an automatic surface unit control knob and a regular surface unit control knob respectively;

FIG. 3A is a sectional side view of a surface unit of the type incorporated in the range of FIG. 1 showing the temperature sensor;

FIG. 8 is a flow diagram of the TEMP INPUT routine incorporated in the control program for the microprocessor in the circuit of FIG. 5;

DETAILED DESCRIPTION OF THE ILLUSTRATIVE EMBODIMENT

Figure 3B:
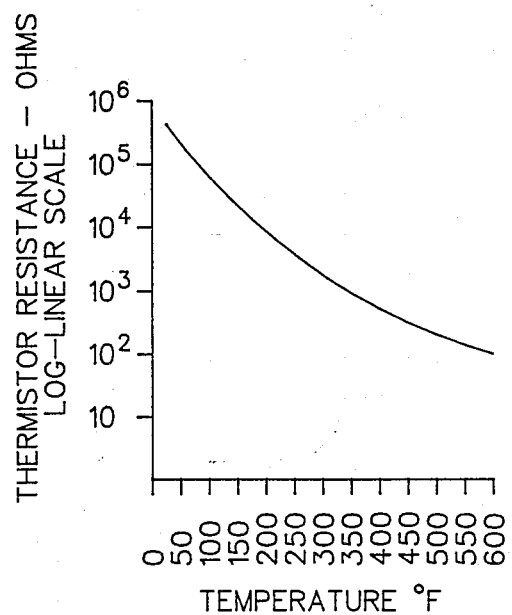
FIG. 3B is a graphic representation of the resistance versus temperature characteristics for the temperature sensor of FIG. 3A.

FIG. 1 illustrates an electric range 10 incorporating a control arrangement illustratively embodying the present invention. Range 10 includes four conventional electric surface units 12, 14, 16 and 18 supported from a substantially horizontal support surface 20. Each of units 12-18 are adapted to support cooking utensils, such as frying pans, sauce pans, tea kettles, etc., placing thereon for heating. Heating unit 12 is arranged to function as an automatic surface unit, that is, energization of unit 12 is automatically controlled as a function of the sensed temperature of the utensil being heated thereon and the user selected heat setting. Heating units 14, 16 and 18 are arranged to be duty cycle controlled to provide a predetermined output power level corresponding to the user selected power setting. While, as is common practice, the range of the illustrative embodiment is provided with only one automatic surface unit, it will be appreciated that multiple automatic surface units could be provided.

Manually operable rotary control knobs 22, 24, 26 and 28 are mounted to control panel 30. Control knobs 22 and 24 are illustrated in greater detail in FIGS. 2A and 2B respectively. Control knob 22 enables the user to select a plurality of heat settings corresponding to various cooking temperatures for the Fry Mode, and to select Warm, Simmer and Lo, Med and Hi Boil Modes for the general Boil mode. In the Boil mode the user may select from a plurality of heat settings within these modes as well. Mode selection switch 32 on control panel 30 enables the user to select the Fry Mode or the general Boil Mode for heating element 12. Knob 24 and knobs 26 and 28 which are identical to knob 24 enable the user to select the desired one of power levels 1-15 for heating units 14, 16 and 18, respectively.

The utensil temperature sensing arrangement employed with the automatic surface unit in the illustrative embodiment will now be described with reference to FIG. 3A. Surface unit heating element 12A of surface unit 12 is supported on spider arms 33. The temperature sensor apparatus deignated generally 34 includes a housing 36 mounted on one end of an elongated, generally L-shaped tubular arm 38.

A cylindrical shield 40 of low thermal mass metal forms the central core to which the radial spider arms 33 are attached and also serves to shield sensor housing 36 from radiated heat from heating element 12A. Arm 38 extends through a slot 42 in shield 40, and bears against the upper end of the slot to hold housing 36 in the proper position slightly above the element 12A so as to cause the uppermost surface 37 of housing 36 to resiliently contact the bottom of a cooking utensil when it is placed on heating unit 12. The temperature sensitive element (not shown) of the sensor contained within housing 36 is a conventional negative temperature coefficient thermistor having a resistance vs. temperature characteristic as shown in FIG. 3B. The structural details of this sensor arrangement do not form any part of the subject invention and are thus described only to the extent necessary for an understanding of the present invention. Such devices are described in greater detail in commonly assigned U.S. Pat. No. 4,241,289, the disclosure of which is hereby incorporated by reference.

Figure 4:
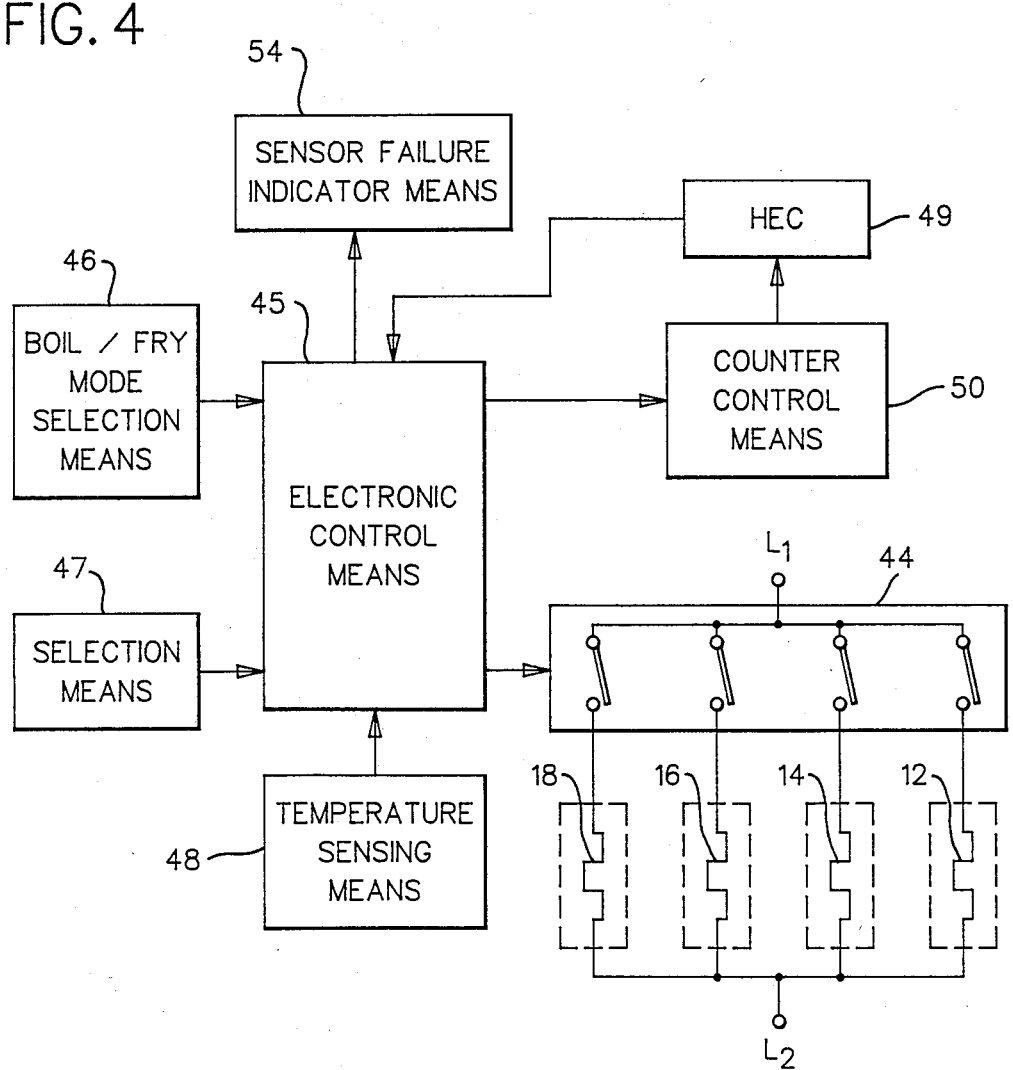
FIG. 4 is a greatly simplified functional block diagram of the control arrangement employed in the range of FIG. 1 embodying the sensor failure detection arrangement of the present invention.

A generalized functional block diagram of the control arrangement for heating units 12-18 of range 10 is shown in FIG. 4. Heating units 12-18 are energized by a standard 60 Hz AC power signal which can be either 120 or 240 volts supplied to terminals L1 and L2. Power to units 12-18 is controlled by switch means 44 comprising a separate switching device for each of units 12-18. The switching devices of switch means 44 are each switched into and out of conduction by control signals generated by electronic control means 45.

Electronic control means 45 generates power control signals for unit 12 in response to inputs from the user operable input selection means comprising Boil/Fry mode selection means 46 and heat setting selection means 47, signifying mode and heat setting selections respectively and inputs from temperature sensing means 48 which senses the temperature of the utensil being heated by element 12. Power control signals for units 14-18 are generated in response to the heat setting selections entered via selection means 47.

A heater energy counter 49 is provided for each of heating units 12, 14, 16 and 18 which is incremented and decremented by counter control means 50 such that the count is approximately proportional to the temperature of the heating element. Such use of a heater energy counter is described in detail in commonly assigned U.S. Pat. No. 4,551,618, the disclosure of which is hereby incorporated by reference.

In the illustrative embodiment, electronic control means 45 controls the output power level of each of heating units 12-18 by controlling the duty cycle, i.e., the percentage of time power is applied to each heating element. A predetermined control period comprising a fixed number of control intervals is employed as the time base for power cotrol. The ratio of conductive control intervals to the total number of control intervals in the control period, expressed as a percentage, is hereinafter referred to as the duty cycle. Preferably each control interval comprises eight full cycles of the standard 60 Hz 240 volt AC power signal corresponding to a time period of approximately 133 milliseconds. Each control period comprises 128 control intervals corresponding to a time period of approximately 17 seconds. The duration for the control interval and control period selected provide a satisfactory range of heat settings for desired cooking performance and can be programmed to make efficient use of microprocessor memory. It is understood, however, that control intervals and control periods of greater and lesser duration could be similarly employed.

TABLE I

| COL. 1 POWER LEVEL | COL. 2 % ON TIME | COL. 3 ON CONTROL INTERVALS PER CONTROL PERIOD | COL. 4 OFF CONTROL INTERVALS | COL. 5 HEATER ENERGY COUNT RATES (COUNTS PER ENERGIZED CONTROL INTERVAL) | | COL. 6 HEATER ENERGY COUNT RATES (COUNTS PER CONTROL PERIOD) | | COL. 7 MAX. HEC COUNT |
|---|---|---|---|---|---|---|---|---|
| | | | | Increment | Decrement | Increment | Decrement | |
| 0 | 0 | 0 | 128 | ½ | ½ | — | 64 | — |
| 1 | 2 | 3 | 125 | 5⅓ | 2⅔ | 16 | 8 | 4096 |
| 2 | 3 | 4 | 124 | 5⅓ | 2⅔ | 21⅓ | 10⅔ | 4096 |
| 3 | 5 | 7 | 121 | 5⅓ | 2⅔ | 37⅓ | 18⅔ | 4096 |
| 4 | 8 | 10 | 118 | 5⅓ | 2⅔ | 53⅓ | 26⅔ | 4096 |
| 5 | 11 | 14 | 114 | 4 | 2 | 56 | 28 | 5120 |
| 6 | 14 | 18 | 110 | 4 | 2 | 72 | 36 | 5120 |
| 7 | 20 | 26 | 102 | 4 | 2 | 104 | 52 | 5120 |
| 8 | 26 | 33 | 95 | 2⅔ | 1 | 88 | 33 | 6144 |
| 9 | 33 | 42 | 86 | 2⅔ | 1 | 112 | 42 | 6144 |
| 10 | 41 | 53 | 75 | 2⅔ | 1 | 141⅓ | 53 | 6144 |
| 11 | 50 | 64 | 64 | 2 | — | 128 | — | 8192 |
| 12 | 60 | 80 | 48 | 2 | — | 160 | — | 8192 |
| 13 | 72 | 96 | 32 | 2 | — | 192 | — | 8192 |
| 14 | 85 | 112 | 16 | 2 | — | 224 | — | 8192 |
| 15 | 100 | 128 | 0 | 2 | — | 256 | — | 8192 |

Electronic control means 45 selectively implements one of sixteen different duty cycle power levels, including a zero duty cycle or OFF level in accordance with user selected power settings. Table I shows the percentage ON time, i.e. the duty cycle and the number of conductive control intervals per control period for each of sixteen available power levels.

In the illustrative embodiment each of heating units 14-18 is operated as a regular surface unit. The user selects the desired one of the fifteen available power levels by manipulation of the corresponding one of control knobs 24-28. Control means 45 then switches the associated heating element into conduction for the number of control intervals during each control period to implement the duty cycle associated with the selected power level. The duty cycle for each of the power levels is shown in Table I.

For unit 12, an automatic surface unit, the power level is determined in accordance with user selection of the Fry and Boil modes which are only briefly described herein. A power control arrangement implementing such operating modes is described and claimed in commonly assigned U.S. Pat. No. 4,493,980 which is hereby incorporated by reference. The user selects the Fry or Boil Mode by manipulation of mode switch 32.

The Fry Mode is intended to rapidly bring the temperature of the utensil to the selected relatively narrow operating temperature range while avoiding extensive temperature overshoots and undershoots which can adversely affect cooking performance. Relatively tight control over the steady state operating temperature of the heating element is desired in the heating of a wide variety of food loads. The temperature range and steady state power level associated with each heat setting for the Fry Mode in the illustrative eabodiment is shown in Table II.

TABLE II

| Fry Mode | | | Boil Mode | | |
|---|---|---|---|---|---|
| User Selected Heat Setting | Steady State Utensil Temp. Range °F. | Steady State Power Level | User Selected Heat Setting | Steady State Utensil Temp. Range °F. | Steady State Power Level |
| OFF | — | 0 | OFF | — | 0 |
| Wm | 116–140 | 2 | Wm(1) | 116–140 | 2 |
| Wm | 116–140 | 3 | Wm(2) | 116–140 | 3 |
| 150 | 141–165 | 5 | Wm(3) | 141–165 | 4 |
| 175 | 166–190 | 6 | Sim(1) | 191–215 | 4 |
| 200 | 191–215 | 7 | Sim(2) | 191–215 | 5 |
| 225 | 216–240 | 8 | Sim(3) | 191–215 | 6 |
| 250 | 241–265 | 8 | Lo(1) | 216– | 8 |
| 275 | 266–290 | 9 | Lo(2) | 216– | 9 |
| 300 | 291–315 | 10 | Lo(3) | 216– | 10 |
| 325 | 316–340 | 11 | Med(1) | 216– | 11 |
| 350 | 341–365 | 11 | Med(2) | 216– | 11 |
| 375 | 366–390 | 12 | Med(3) | 216– | 12 |
| 400 | 391–415 | 13 | Hi(1) | 216– | 13 |
| 425 | 416–440 | 14 | Hi(2) | 216– | 14 |
| 450 | 441–465 | 14 | Hi(3) | 216– | 14 |

The General Boil Mode, when selected via mode switch 32, enables the user to select the Warm, Simmer and actual Boil Modes, the latter being further divided into Lo, Med and Hi Boil Modes. The temperature ranges and power levels for each heat setting for the generalized Boil Mode is also shown in Table II.

The purpose of the Warm Mode is to enable the user to warm food quickly to a predetermined relatively low temperature substantially less than the boiling point of water. Three Warm settings, Wm(1), Wm(2), and Wm(3) are available in the Warm mode. The Simmer Mode enables the user to heat food rapidly to a temperature closely approaching but not exceeding the boiling point of water (212° F.) and then to hold the temperature of the food at this level without boiling when left unattended.

There are three heat settings for the Simmer Mode designated in Table III as Sim(1), Sim(2) and Sim(3). The steady state temperature range for all three settings is 198°–220° F. This range for the sensed utensil temperature assures that the contents of the utensil will be near the boiling point of water (212° F.) but will not be hot enough to actually boil.

The three actual boil modes, that is the three modes for controlling the actual boiling of water loads contained in utensils placed on heating unit 12, are designated Lo, Med, and Hi Modes. Each of these modes has three heat settings for Lo, Med and Hi Boil Modes, respectively, for control knob 22 (FIG. 2A); hence, in the illustrative embodiment the user can select from a total of 9 heat settings for boiling water loads on heating unit 12.

These nine heat settings enable the user to select the steady state power level or duty cycle which will achieve the desired boiling rate for various size water loads without employing a power level substantially higher than necessary thereby enhancing the energy efficiency of the appliance.

It will be appreciated that the temperature sensor circuit for the automatic surface unit though generally highly reliable is vulnerable to open circuit and short circuit failures. An open circuit failure appears to the electronic controller as a very high resistance and a short circuit failure appears as a very low resistance. In accordance with the resistance versus temperature characteristic of the thermistor employed in sensor 34 shown in FIG. 3B, high resistance signifies low temperature and low resistance signifies high temperature. Consequently, without the diagnostic arrangement of the present invention hereinafter described, the power control system would respond to an open circuit failure by energizing the surface unit at full power and to a short circuit failure by de-energizing the surface unit.

The control arrangement of the present invention detects the occurrence of an abnormal operating condition of the sensor circuit in the form of either a short circuit or an open circuit failure. Use is made of sensed utensil temperature sensor information together with heater energy counter information to detect an abnormal operating condition.

It will be recalled that the heater energy counter provides approximate tracking of the heating unit temperature. To this end, counter control means 50 responds to electronic control means 45 to selectively increment energy counter means 49 at one of a plurality of possible increment rates, each of which is approximately proportional to the rate of increase of the heating element temperature during the transient heat-up phase when the temperature of the heating unit is rising to its operating temperature. The particular increment rate selected is determined by the power level at which the unit is then operating. Counter control means 50 is further operative to discontinue incrementing the energy counter 49 when the count of the counter at least equals a selected one of a plurality of maximum counts, each of which is approximately proportional to the steady state heating unit operating temperature for corresponding power levels. The particular maximum count selected from this plurality of maximum counts is likewise determined by the power level at which the unit is operating.

Counter control means 50 is further operative to decrement energy counter means 49 when the applied power level is changed from a higher level to a lower level or OFF at one of a plurality of predetermined decrement rates, each of which is approximately proportional to the rate of decrease of the heating unit temperature during the cool-down phase as the heating unit temperature decreases from the relatively high steady state operating temperature associated with the higher power level to the relatively low, steady state operating temperature associated with the newly selected lower power level. The counter control means discontinues decrementing the heating energy counter when the count is less than the predetermined maximum count corresponding to the lower power level.

The increment and decrement rates per control interval and per control period and maximum counts are shown in Cols. 5, 6 and 7, respectively, of Table I for each of the power levels.

In the illustrative eabodiment, an increment rate is selected which provides the desired net increase in the count at the end of each control period representing the approximate increase in temperature of the heating unit during that control period for the duty cycle at which the unit is operating. This is carried out by incrementing at a relatively slow rate during energized control intervals and holding the count constant during non-energized control intervals.

As shown in Table I, maximum counts are provided for various power settings 1-4 at a maximum count of 4096, settings 507 at a maximum count of 5120, settings 8-10 at a maximum count of 6144, and settings 11-15 at a maximum count of 8192. It has been empirically determined that the maximum counts provide satisfactory approximations of the maximum temperature of the heating unit when operating at the corresponding power level.

As with the increment rates, the decrement counts per control interval are the same for settings within each group; however, the rate per control period varies within each group due to the differing number of ON control intervals per control period for each setting. For each of tne power settings, the decrement rate per control period is selected as a linear approximation of the temperature curve characteristic of the cool-down phase for the heating element.

Heater energy counter information is useful in detecting temperature sensor failure because when the temperature sensor is operating properly a correlation exists between the count of the heater energy counter and the temperature sensed by the temperature sensor. This correlation is only approximate since the temperature sensor provides much more accurate temperature information than does the heater energy counter. Nonetheless, a correlation does exist at least to the extent that under normal operating conditions, when the heater energy count is relatively high the sensed temperature will also be relatively high and when the heater energy count is relatively low the sensed temperature will also be relatively low.

In accordance with the present invention use is made of this correlation to detect both open circuit and short circuit sensor circuit failures. To this end, a reference heater energy count range bounded by predetermined high and low reference counts, and a correlative temperature range bounded by predetermined maximum and minimum diagnostic reference temperatures can be established such that under normal operating conditions when the count is within its reference range, the sensed temperature will be within its correlative temperature range. The control means includes means for detecting a sensor fault condition when the count is within its reference range and the sensed utensil temperature is outside its correlative diagnostic reference temperature range. For a negative temperature coefficient thermistor such as is used in the illustrative embodiment, a sensed utensil temperature higher than the high diagnostic reference temperature when the heater energy count is less than the high reference count signifies a short circuit failure of the sensor circuit. Similarly, a sensed utensil temperature less than the minimum diagnostic reference temperature when the heater energy count is greatr than the low reference count indicates an open circuit failure in the sensor circuit.

In the illustrative embodiment, the high reference count is selected to be 6 K which is 75% of the maximum steady state count for the four highest available power levels of 8 K. The maximum temperature control reference temperature is 465° F. The maximum diagnostic reference temperature is the maximum readible temperature for the A/D circuit which is slightly higher than the maximum control reference at approximately 488° F. The low reference count is selected to be 3 K, which is 75% of the maximum steady state count of 4 K for the lowest four power levels. The minimum reference diagnostic temperature is set at 90° F. These reference values are all somewhat arbitrarily selected. Satisfactory perforaance is achievable with other values as well, provided that the high reference count be selected low enough that the count will always be exceeded before the maximum reference temperature is exceeded even under the most extreme high temperature load conditions. Similarly, the low reference count and diagnostic reference temperature should be selected such that the sensed temperature will always exceed the minimum reference temperature for the extreme slow heating load conditions before the heater energy count has reached the low reference count.

User discernible signal generating means are provided to alert the user to the occurrence of an abnormal operating condition in the sensor circuit. In addition, upon detection of an abnormal condition the heating unit is deenergized. In the illustrative embodiment two signal lights are provided, one to signify the occurrence of a short circuit failure and the other to signify an open circuit failure. This diagnostic feature aids the serviceperson in diagnosing and correcting the condition. The signal lights will remain energized and the heating unit will remain deenergized until power is removed from the circuit such as would occur when the appliance is unplugged for servicing.

Circuit Description

Figure 5:
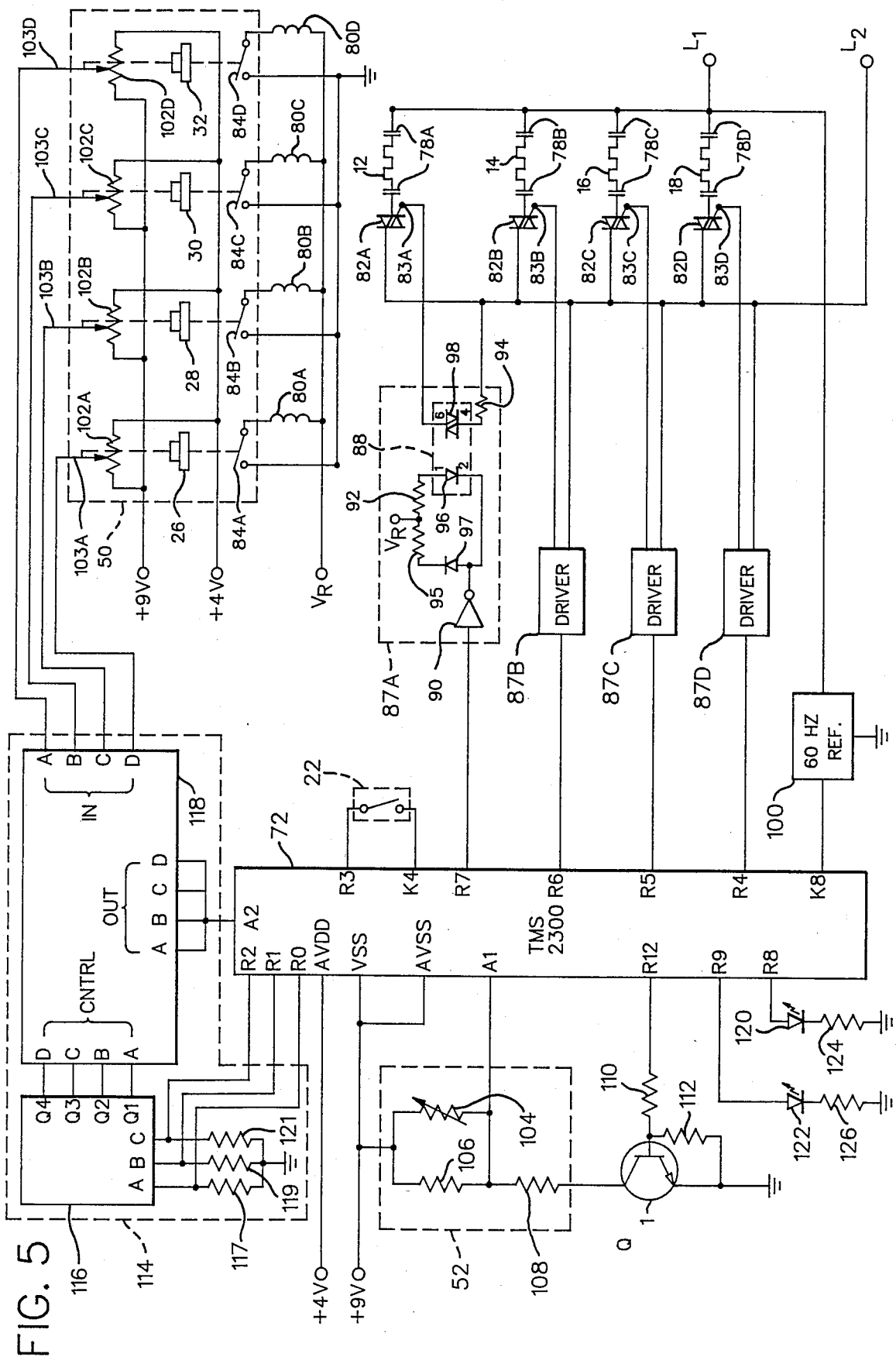
FIG. 5 is a simplified schematic diagram of a control circuit for the range of FIG. 1.

A control circuit illustratively implementing the hereinbefore described operating modes and illustratively embodying the sensor circuit failure detection arrangement of the present invention is represented in simplified schematic form in FIG. 5. Power to energize heating units 12-18 is provided by application of a standard 60 Hz AC power signal of either 120 or 240 volts across terminals L1 and L2. Heating units 12-18 are arranged in electrical parallel fashion across lines L1 and L2 via normally open relay contacts 78A-78D controlled by relay coils 80A-80D and power control triacs 82A-82D respectively. Each of on-off relay coils 80A-80D is serially connected between DC reference voltage supply of V and system ground via switch contacts 84A-84D respectively. Each of switch contacts 84A-84D is mechanically coupled in conventional manner (illustrated schematically) to control knobs 26-32 respectively such that each of switch contacts 84A-84D is in its open position when its associated control knob is in its off position. Movement of its associated control knob from its off position places the switch in its closed position, energizing the associated one of coils 80A-80D which in turn closes associated contacts 78A-78D respectively thereby enabling the corresponding one of power control triacs 82A-82D to control energization of the corresponding heating element.

Microprocessor 72 controls the switching of power control triacs 82A-82D by trigger signals provided at output ports R7, R6, R5 and R4 respectively. The signals at output ports R7, R6, R5 and R4 are coupled to the gate terminal of the associated triacs via driver circuits 87A–87D respectively. Referring to circuit 87A, which is shown in greater detail, the trigger signal at R7 is coupled to pin 2 of opto-isolator device 88 by inverting buffer amplifier 90. Pin 1 of opto-isolator 88 is coupled to DC reference voltage supply via current limiting resistor 92. The output return pin 4 of opto-isolator 88 is coupled to power line L2 via current limiting resistor 94. Pin 6 is coupled to the gate terminal 83A of power control triac 82A which is connected in series with heating element 12. The trigger signal at R7 is inverted by amplifier 90 forward biasing light emitting diode 96 of opto-isolator 88 which in turn switches the bi-polar switch portion 98 of opto-isolator 88 into conduction to apply a gate signal to power control triac 82A switching it into conduction. The output of amplifier 90 is also coupled to the DC reference voltage sup $V_R$ via current limiting resistor 95 and diode 97. Driver circuits 87B–87D are similarly configured.

A 60 Hz pulse train is generated by conventional zero crossing detector circuit 100 coupled between L1 and input port K8 of microprocessor 72 to facilitate synchronization of triac triggering and other control system operations with zero crossings of the 60 Hz AC power signal applied across L1 and L2.

Sensed utensil temperature inputs are provided to microprocessor 72 via temperature sensing means 52 comprising a thermistor device 104 connected in parallel with linearizing precision resistor 106 and in series with precision resistor 108 forming a voltage divider network energized by a regulated +9 volt dc voltage supply. The divider network is coupled to ground through transistor Q1. The junction of thermistor 104 and resistor 108 is coupled to microprocessor input port A1. The analog voltage at this point is proportional to the temperature sensed by the thermistor. Microprocessor 72 has an internal 8-bit A/D converter which operates between voltage rails AVSS and AVDD which are set at 9 volts DC and 4 volts DC respectively, to provide a 5 volt voltage swing. The internal A/D converter measures the input voltage signal at A1 and converts this signal to a corresponding digital value. Table III lists representative values of the thermistor resistance, and corresponding temperature and analog voltage values. Also shown in Table III is the Hexadecimal representation of the corresponding 8 bit binary code resulting from the A/D conversion of the analog voltage values.

Transistor Q together with biasing resistors 110 and 112 functions as a disabling circuit. Output port R12 of microprocessor 72 is coupled to the base of Q1 via resistor 110. Resistor 112 is connected between the emitter and the base of transistor Q1. The function of the disabling circuit is to only allow current flow through thermistor 104 when temperature measurements are being made. To this end, when a temperature measurement is to be made, microprocessor 72 sets output R12 causing a positive voltage to be applied to the base of Q1 via resistor 110 switching Q1 into conduction. After the temperature input is obtained, R12 is reset rendering Q1 and thermistor 104 non-conductive.

TABLE III

| Temperature °F. | Resistance ( ) | Analog Volts | Hex Rep | Dec Rep |
|---|---|---|---|---|
| 115 | 22,000 | 4.71 | 24 | 36 |
| 140 | 11,500 | 4.86 | 2C | 44 |
| 165 | 7,600 | 5.04 | 35 | 53 |
| 190 | 5,000 | 5.33 | 44 | 68 |
| 215 | 3,300 | 5.63 | 53 | 83 |
| 240 | 2,100 | 6.02 | 67 | 103 |
| 265 | 1,500 | 6.41 | 7B | 123 |
| 290 | 1,050 | 6.82 | 90 | 144 |
| 315 | 740 | 7.16 | A1 | 161 |
| 340 | 560 | 7.47 | B1 | 177 |
| 365 | 410 | 7.77 | C0 | 192 |
| 390 | 320 | 7.96 | CA | 202 |
| 415 | 250 | 8.14 | D3 | 211 |
| 440 | 200 | 8.27 | DA | 218 |
| 465 | 150 | 8.45 | E3 | 227 |

User inputs are provided to microprocessor 72 via Boil/Fry Mode selection switch means 22 and heat setting selection means 50 comprising input potentiometers 102(A)–(D) associated with heating elements 12–18 respectively. Mode selection switch 22 is directly coupled between output port R3 and input port K4 of microprocessor 72. The open and closed states of switch 22 signify selection of the general Boil Mode and Fry Mode, respectively. Microprocessor 72 determines the state of switch 22 by periodically generating a logical high signal at R3 and monitoring the input signal at K4.

Each of input potentiometers 102(A)–(D) is coupled between a regulated 9 volt dc and a regulated 4 volt dc reference voltage supply. Each of wiper arms 103(A)–(D) of potentiometers 102(A)–(D) respectively is coupled to A/D input port A2 of microprocessor 72 via multiplexing circuit 114. Each wiper arm is positioned by user rotation of the associated one of control knobs 26–32. The voltage between the wiper arm and the 4 volt supply is an analog signal representing the selected heat setting. The internal A/D converter of microprocessor 72 described briefly above for processing the temperature inputs processes analog voltages appearing at A2 representing the user input settings in multiplex fashion.

Multiplexing circuit 114 comprises a conventional decoding circuit 116 configured to function as a 3 line to 4 line decoder and a gating circuit 118 which gates the appropriate wiper arm voltage signal to microprocessor input port A2. Multiplexing is controlled by scanning signals generated at output ports R0, R1, and R2, which are coupled to input ports A, B, and C of decoder 116. Biasing resistors 117, 119, and 121 are connected between R0, R1, and R2 respectively and ground. Decoder outputs Q1–Q4 are coupled to the control ports A–D of gating circuit 118. Input ports A–D of gating circuit 118 are connected directly to wiper arms 103(D)–(A) respectively. Output ports A–D of gating circuit 118 are commonly connected to input port A2 of microprocessor 72. The scan signals at R0, R1 and R2 sequentially generate enabling signals at outputs Q1–Q4. These enabling signals are coupled to the control inputs of gating circuit 118 to sequentially couple the analog wiper arm voltage signals from input ports A–D to A2 of microprocessor 72.

The processing of the resultant digitized temperature and power setting input signals will be described in conjunction with the following description of the control program.

User discernible signal generating means is provided in the form of light emitting diodes (LEDs) 120 and 122 coupled between output ports R8 and R9 respectively and ground via current limiting resistors 24 and 126 respectively. LED 120 is energized by a signal at R8 in response to detection of a short circuit failure. LED 122 is similarly energized by a signal at R9 in response to detection of an open circuit failure.

The component values listed in Table IV are suitable for use in the circuit of FIG. 5. These values are illustrative only, and are not intended to limit the scope of the claimed invention.

TABLE IV

| Fixed Resistors (Ω) | | | | Transistor Q1 | |
|---|---|---|---|---|---|
| 92 | 1K | 124 | 10K | 2N2222 | |
| 94 | 220 | 126 | 10K | | |
| 95 | 270 | | | Integrated Circuits | |
| 106 | 2.21K | 1% precision | | 88 | MDC 3020 Integrated Circuit |
| 108 | 2.21K | 1% precision | | 90 | ULN 2004A Integrated Circuit |
| 110 | 22K | | | 116 | CD4028BC Integrated Circuit |
| 112 | 27K | | | 118 | CD4026BC Integrated Circuit |
| 117 | 10K | | | | |
| 119 | 10K | | | | |
| Potentiometer (Ω) | | | | | |
| 102A | 50K | | | | |
| Thermistor (Ω) | | | | Microprocessor | |
| 104 | 50K | | | 72 | Texas Instruments TMS 2300 |
| | | | | Triac | |
| | | | | 82 | General Electric SC 147 |
| | | | | Surface Unit | |
| | | | | 12 | General Electric WB 30 X 348 |
| | | | | 14 | General Electric WB 30 X 359 |
| | | | | 16 | General Electric WB 30 X 348 |
| | | | | 18 | General Electric WB 30 X 359 |

Control Program Description

Microprocessor 72 is customized to perform control functions in accordance with this invention by permanently configuring the Read Only Memory (ROM) of microprocessor 72 to implement predetermined control instructions. FIGS. 6 through 13 are flow diagrams which illustrate the control routines incorporated in the control program of microprocessor 72. From these diagrams one of ordinary skill in the programming art can prepare a set of control instructions for permanent storage in the ROM of microprocessor 72. For the sake of simplicity and brevity, the control routines to follow will be described with respect to the implementation of representative control algorithms. It should be understood that in addition to the control functions of the present control arrangement herein described there may be other control functions to be performed in conjunction with other operating characteristics of the appliance. Instructions for carrying out the routines described in the diagrams may be interleaved with instructions and routines for other control functions.

The control program consists of a sequence of routines which act on information stored in the Random Access Memory (RAM) of microprocessor 72. The RAM is arranged in four files, with one file associated with each surface unit. A register designated the X register is used to address the desired one of the four files. The control program is executed once during each control interval for each surface unit sequentially executing the control program on successive RAM files.

Figure 6:
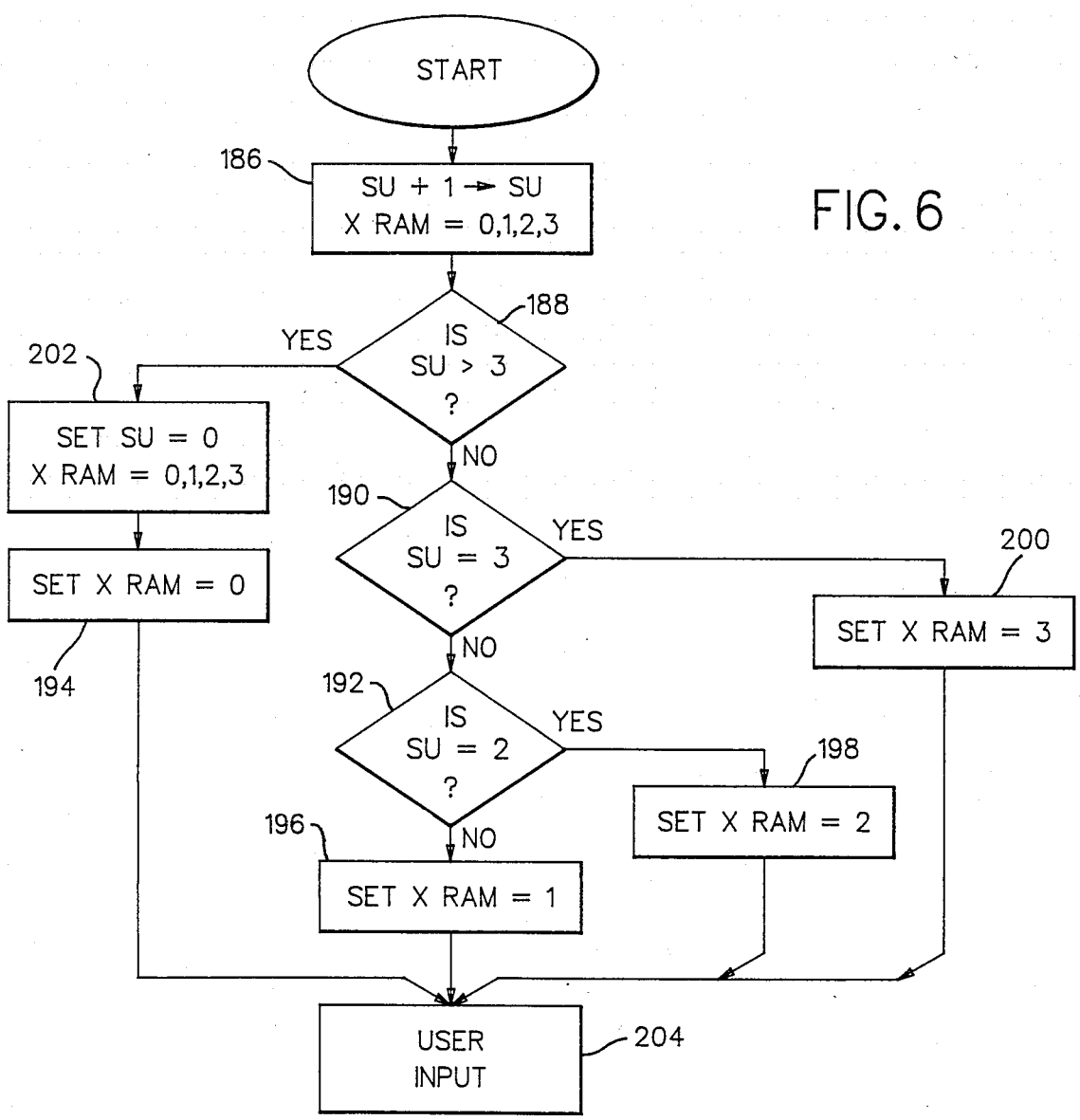
FIG. 6 is a flow diagram of the START routine incorporated in the control program for the microprocessor in the circuit of FIG. 5.

START Routine—FIG. 6

This routine is entered at the beginning of each control interval and each pass through the control program. The function is to call up the appropriate RAM file for the current pass through the control program. A counter is provided in each RAM file designated the SU counter. Each SU counter functions as a four count ring counter and used to call up the RAM files sequentially such that each RAM file is called up every fourth pass through the Control Program.

Referring now to FIG. 6, Block 186 increments the SU counters in all four files, X=0, 1, 2, 3. Inquiries 188, 190 and 192 determine the SU count and call up the appropriate one of RAM files 0, 1, 2 and 3 via Blocks 194, 196, 198 and 200 for SU equal to 0, 1, 2 and 3, respectively. Block 202 resets all of the SU counters to zero when SU equals 4.

Figure 7:
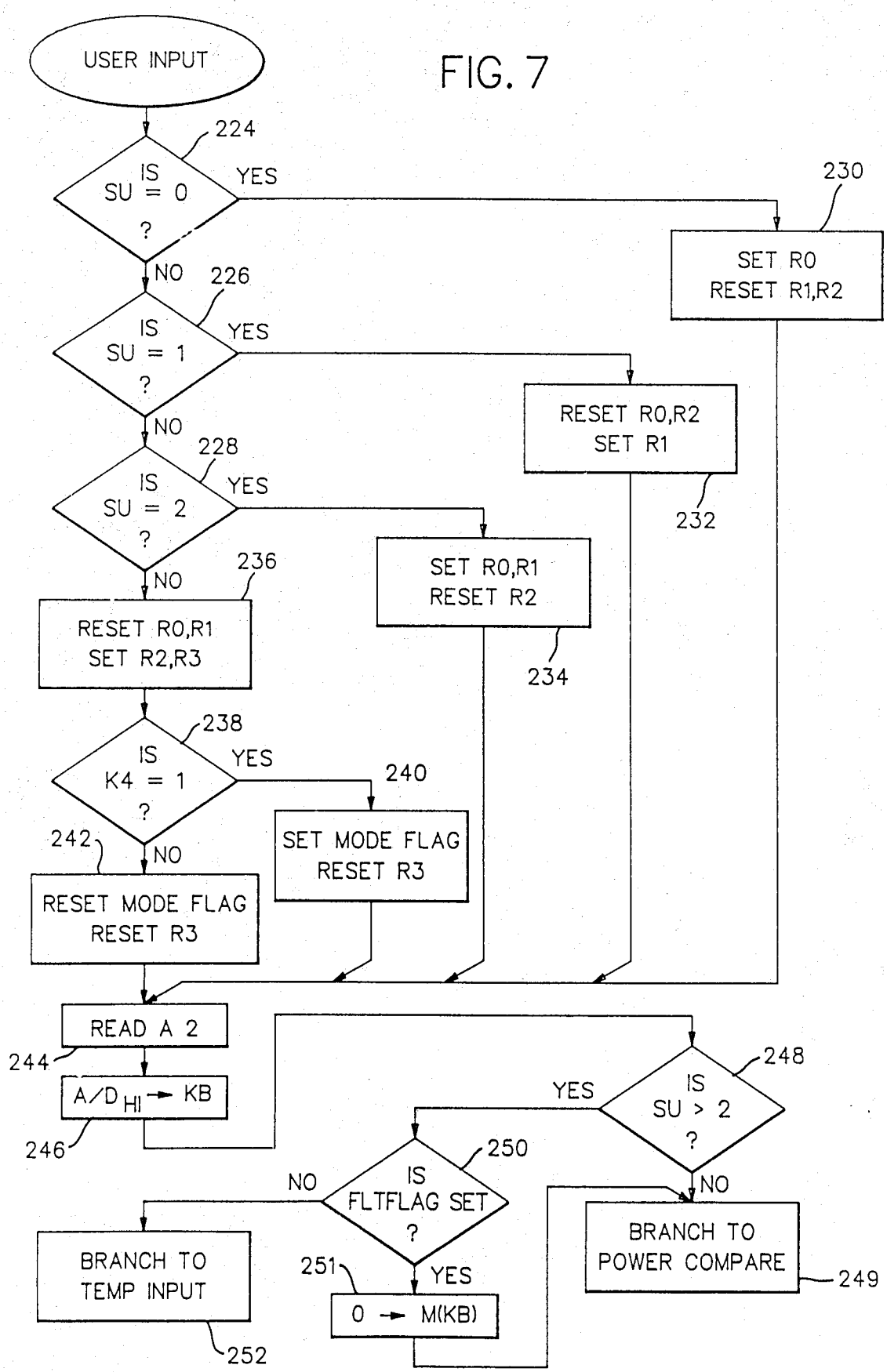
FIG. 7 is a flow diagram of the USER INPUT routine incorporated in the control program for the microprocessor in the circuit of FIG. 5.

After the appropriate RAM file is selected, the program branches (Block 204) to the User Input routine of FIG. 7.

USER INPUT Routine—FIG. 7

The function of this routine is to control the multiplexing of the user selected heat setting input signals at input port A2 via multiplexing circuit 114 (FIG. 5), and to determine whether Boil or Fry has been selected for the automatic surface unit.

It will be recalled that the control program is executed once during each control interval for each surface unit sequentially. Inquiries 224–228 determine for which surface unit the control program is being executed, that is, which surface unit is the subject of the present pass through the program. The three regular surface units 14–18 are designated SU2, SU1, and SU0 respectively; SU3 represents automatic surface unit 12. Blocks 230–236 generate the appropriate binary codes 100, 010, 110, and 001 for SU0–SU3, respectively at output ports R0, R1, and R2 to gate the appropriate one of wiper arms 103A–103D through gating circuit 118 to input port A2.

If SU=3, signifying that the program is being executed for the automatic surface unit, the state of mode select switch 32 (FIG. 1) is determined by setting output R3 (Block 236). Inquiry 238 then scans input port K4 to determine whether switch 32 is open (K4=0) or closed (K4=1). If K4=1, signifying selection of the Fry Mode, a Mode Flag is set for future reference in a subsequent routine and R3 is reset (Block 240). If K4=0, signifying selection of the Boil Mode, the Mode Flag is reset and R3 is reset (Block 242).

Having enabled the appropriate input at input port A2, voltage from the enabled one of potentiometers 102A–102D is converted to a digital signal. It will be recalled that there are 16 possible heat settings, each represented by a corresponding digital signal. The integral A/D conversion routine provided in microprocessor 72 will convert the analog voltage at pin A2 to an eight bit digital code capable of establishing 256 levels. Sixteen wiper arm positions corresponding to 16 heat settings are evenly spaced along the potentiometer. By this arrangement the user selected input setting may conveniently be represented by the four high order bits of the 8 bit A/D output signal. The analog input at port A2 is read in (Block 244) and converted to its corresponding digital signal. The four high order bits of this signal designated A/D HI are stored as the input power setting variable KB (Block 246).

Inquiry 248 determines if the present pass through the control is for the automatic surface unit SU3 (SU 2). If not, the program branches (Block 249) directly to the Power Compare routine of FIGS. 13A–13C If the program is being executed for the automatic surface unit, Inquiry 250 checks the state of the FLTFLG flag. As will be described with reference to the Fault Detect routine (FIG. 10), this flag when set signifies that a sensor failure has been detected. This flag is only reset during Power Up. Thus, once set it remains set until power is removed from the system. If the flag is set, M(KB) is set to zero (Block 251) causing de-energization of the unit and the program branches (Block 252) directly to the Power Compare routine. If not set, the program branches (Block 252) to the Temp Input routine (FIG. 8) to read in the sensed utensil temperature. Consequently, the routines associated solely with the automatic surface unit, namely the Temp Input, Filter and Sensor Timing, Boil, Fry, Warm, and Fault Detect routines are only entered when the control program is operating on the RAM file associated with the automatic surface unit. When the control program is operating on the RAM files for the regular surface units 14–18, the program branches from the User Input routine to the Power Compare routine (FIGS. 11A–11C).

TEMP INPUT Routine—FIG. 8

The function of this routine is to convert the analog voltage at pin A1 representing the sensed utensil temperature to a digital signal representative of the sensed utensil temperature. More specifically, this routine determines within which of 16 predetermined temperature ranges the present sensed utensil temperature falls. A hexadecimal value is assigned to the variable SENINP (and also SENOUT) corresponding to the appropriate one of the 16 temperature ranges, as shown in Table V. The hexadecimal value for the upper temperature threshold value for each temperature range is also included in Table V.

TABLE V

| Hex Rep SENINP & SENOUT | Temp. Range °F. | Hex Code Upper Threshold |
|---|---|---|
| 0 | T≦115 | 24 |
| 1 | 115<T≦140 | 2C |
| 2 | 140<T≦165 | 35 |
| 3 | 165<T≦190 | 44 |
| 4 | 190<T≦215 | 53 |
| 5 | 215<T≦240 | 67 |
| 6 | 240<T≦265 | 7B |
| 7 | 265<T≦290 | 90 |
| 8 | 290<T≦315 | A1 |
| 9 | 315<T≦340 | B1 |
| A | 340<T≦365 | C0 |
| B | 365<T<390 | CA |
| C | 390<T≦415 | D3 |
| D | 415<T≦440 | DA |
| E | 440<T≦465 | E3 |
| F | 465<T | |

Referring now to FIG. 8, R12 is set (Block 270) to turn on transistor Q1 (FIG. 5) thereby enabling energization of thermistor 104. Next the analog voltage representing the sensed temperature is read in and converted to its 8 bit digital representation (Block 272). The variable TC in the flow diagram represents the digital value of the analog signal representing sensed temperature. Inquiries 274-302 determine the temperature range in which the sensed temperature falls and Blocks 304-334 assign the appropriate value to the temperature variable SENINP in accordance with Table V. After establishing the appropriate value for SENINP, R12 is reset (Block 336) to turn off Q1, de-energizing thermistor 104, and the program branches (Block 338) to the Sensor Filter and Timing routine (FIG. 9).

For example, if the sensed temperature is 200° F; the hexadecimal representation of the digital temperature signal will be greater than 44 corresponding to 190° F. and less than 53 corresponding to 215° F. Hence, the answer to Inquiries 274-280 will be Yes. The response to Inquiry 282 will be No. The value 4 will be assigned to SENINP (Block 312). Having assigned a value to SENINP, R12 is reset (Block 336) and the program branches (Block 338) to the Sensor Filter and Timing routine (FIG. 9).

Figure 9:
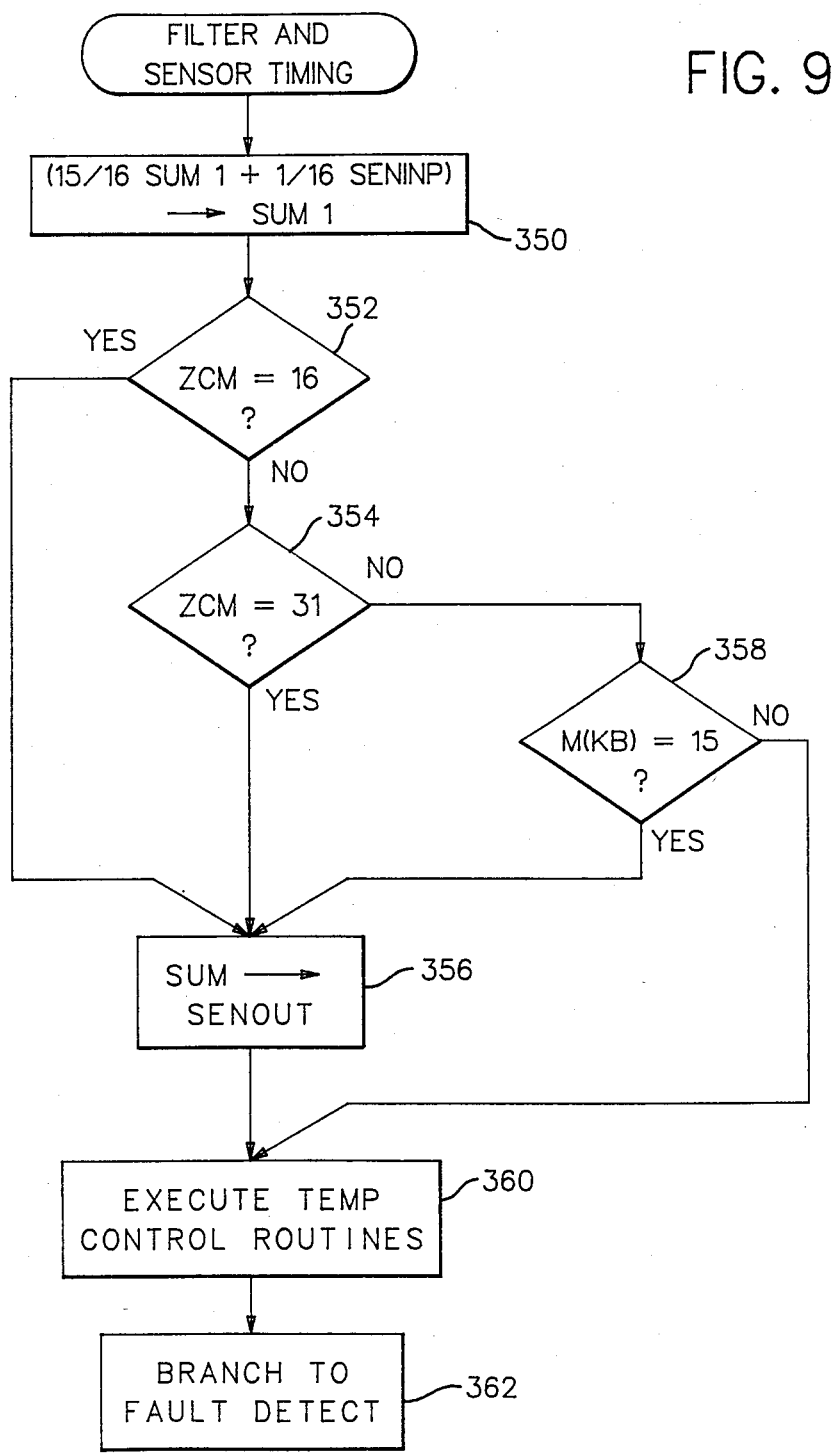
FIG. 9 is a flow diagram of the SENSOR FILTER and TIMING routine incorporated in the control program for the microprocessor in the circuit of FIG. 5.

SENSOR FILTER and TIMING Routine—FIG. 9

This routine performs the dual function of iteratively filtering the sensor output temperature signal SENINP and also controlling the timing of the updating of the temperature signal which is actually used in the temperature control routines. The filter function is implemented to minimize the impact of aberrant temperature measurement inputs from the temperature monitoring circuit; the timing function is implemented to minimize the effect of radiant energy from the heating element 12 impinging on thermistor 104 on the accuracy of the temperature measurements.

The iterative filter portion of this routine attaches relatively little weight to each individual input. Hence, isolated erroneous inputs are averaged out so as to have little effect on the accuracy of the cumulative average signal provided by the filter routine. Referring to FIG. 9, the filter function is performed by Block 350. It will be recalled that SENINP is the hexadecimal representation of the temperature range for the sensed utensil temperature determined in the hereinbefore described TEMP INPUT routine. One-sixteenth of the new SENINP input is added to 15/16 of the filter output variable designated SUM 1 from the previous pass through this routine. The resultant sum becomes the new value for the filter output variable SUM 1.

A new temperature input signal SENINP is processed by the filter portion of this routine to generate a new SUM 1, during each pass through the control routine, i.e. once every 133 milliseconds corresponding to 8 cycles of the 60 Hz power signal. However, to minimize the effects of radiant energy for heating element 12 on sensor 50, the sensed utensil temperature signal which is input to the power control portion of the control program is only updated during selected portions of the 4.4 second duty cycle control period.

A counter designated the ZCM counter operates as a 32 count ring counter, counting from 0–31 and resetting to 0. In the duty cycle control implemented in the Power Out routine hereinafter described, for duty cycles less than 100% the heating element is energized during the first part of the control period when the ZCM count is relatively low and de-energzed while the ZCM count is relatively high. Since, except when operating at the 100% power level, the heating element is always de-energized for count 31, radiant energy effects on the sensor are minimum at ZCM count 31. Thus, radiation effects are minimized by updating SENOUT, the temperature signal utilized in implementation of the Power Control routine only at count 31. It is desirable, however, to have at least two updates of SENOUT during each 4.4 second control period, to limit oscillations between inputs. Hence, SENOUT is also updated at the midpoint of the control period, i.e. at count 16. There is potentially more error due to radiation effects for this measurement; however, the heating element is de-energized at this point for the twelve lower power levels. Hence, the effects of radiation even on this measurement are minimum except at the highest 4 power levels.

When the heating element is operated at 100% duty cycle, the radiation effects are the same at all counts; hence, for maximum accuracy SENOUT is updated during each execution of the control program, i.e. every 133 milliseconds.

Referring again to the flow diagram of FIG. 9, Inquiries 352 and 354 look for ZCM counts of 16 and 31, respectively. Upon the occurrence of either count, SENOUT is updated by the then current value of SUM 1 (Block 356). Otherwise, Inquiry 358 checks to determine if the power level presently being implemented is the 100% power level (M(KB)=15). If it is, SENOUT is updated by SUM 1 (Block 356) regardless of the count., if not, Block 356 is bypassed, and SENOUT is not updated during this pass. In this fashion for power levels lower than 15, SENOUT is updated only on counts 16 and 31, and when power level 15 is being implemented SENOUT is updated every count. Having updated and filtered the temp input, the program then executes the appropriate one of the Boil, Fry or Warm routines designated collectively Temp Control routines (Block 360), the details of which are described in U.S. Pat. No. 4,639,578. The program then branches (Block 362) to the Fault Detect routine (FIG. 10).

Figure 10:
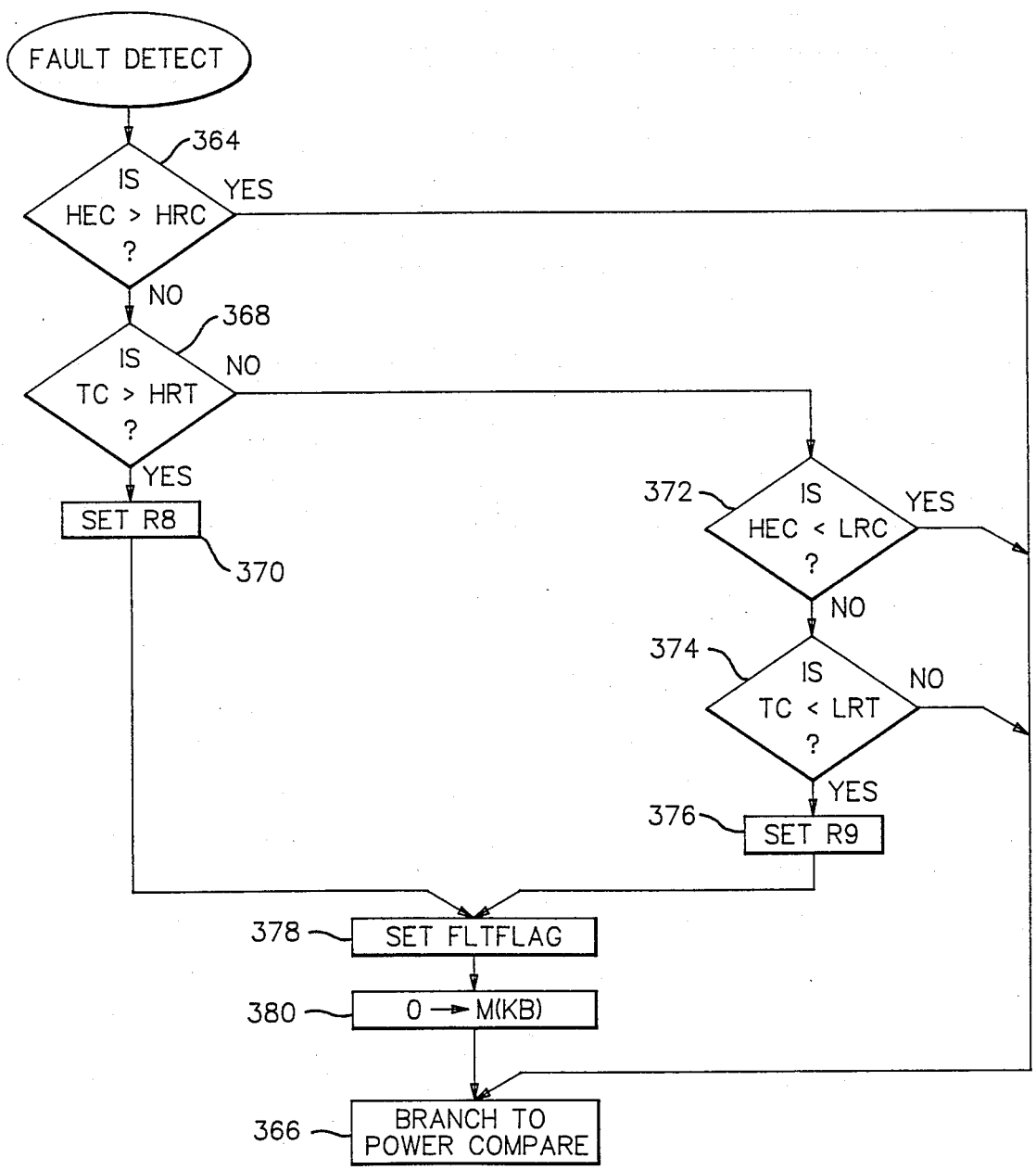
FIG. 10 is a flow diagram of the FAULT DETECT routine incorporated in the control program for the microprocessor in the circuit of FIG. 5.
Figure 11A:
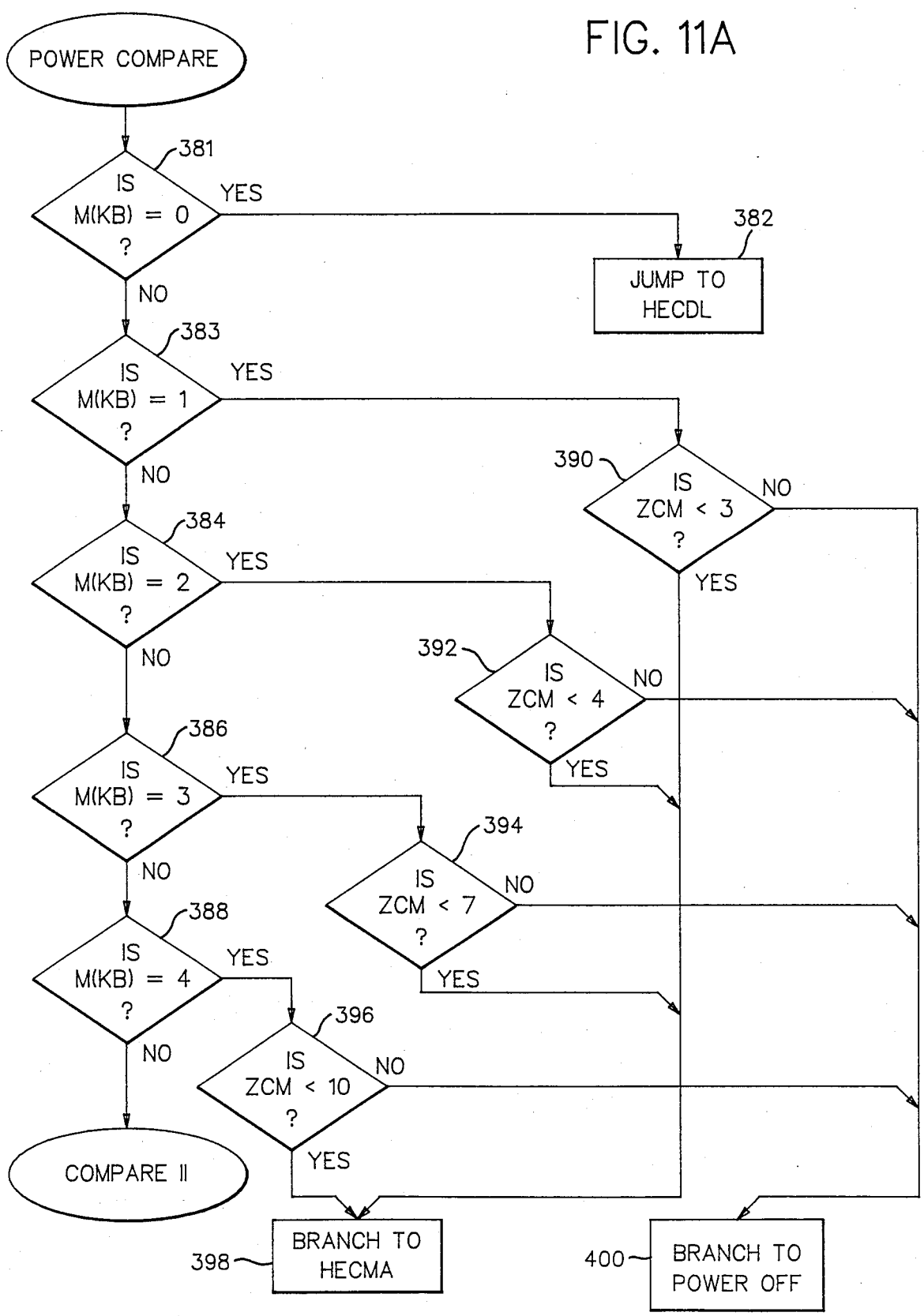
FIGS. 11A, 11B and 11C are flow diagrams of the POWER COMPARE routine incorporated in the control program for the microprocessor in the circuit of FIG. 5.
Figure 11B:
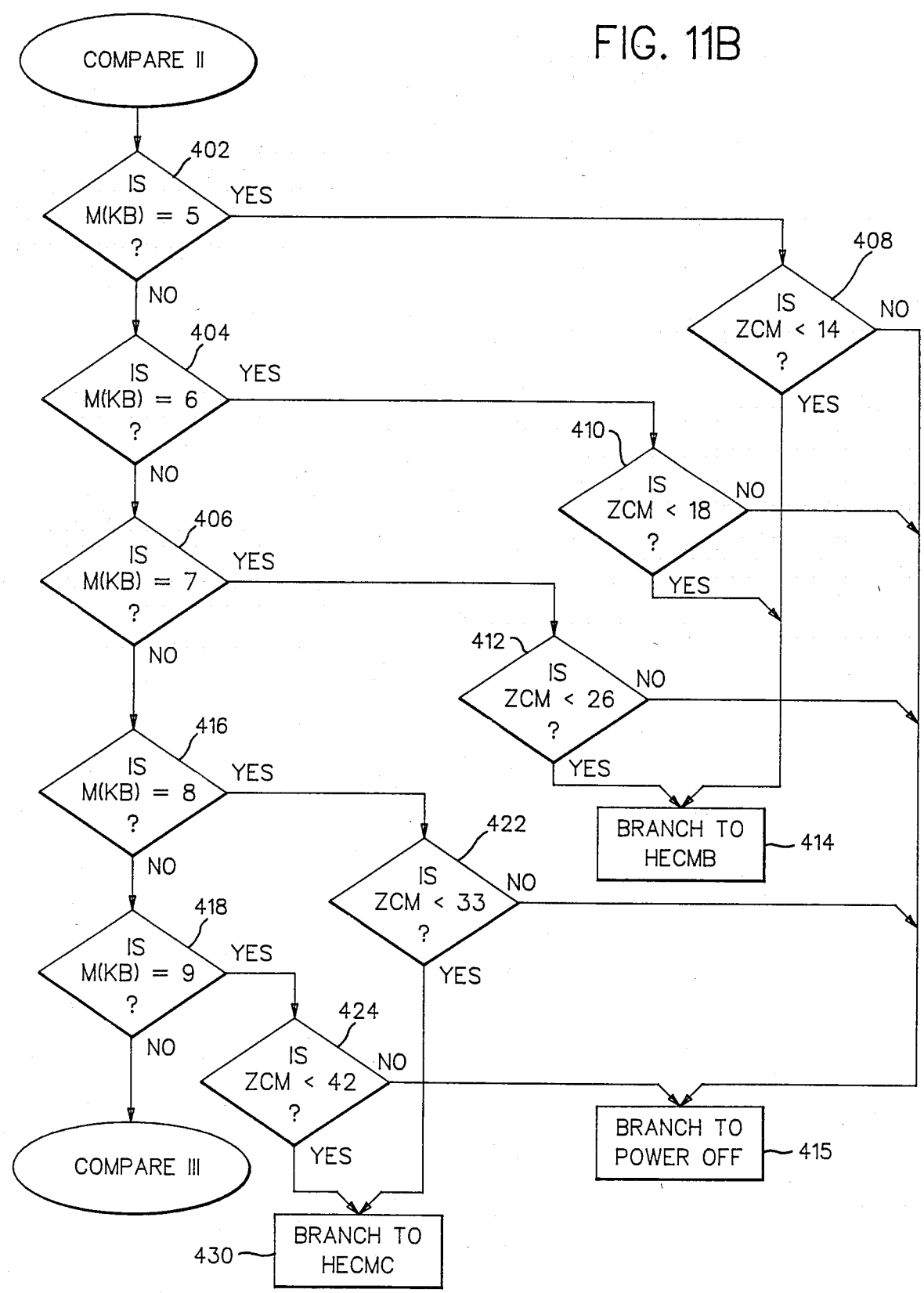
Figure 11C:
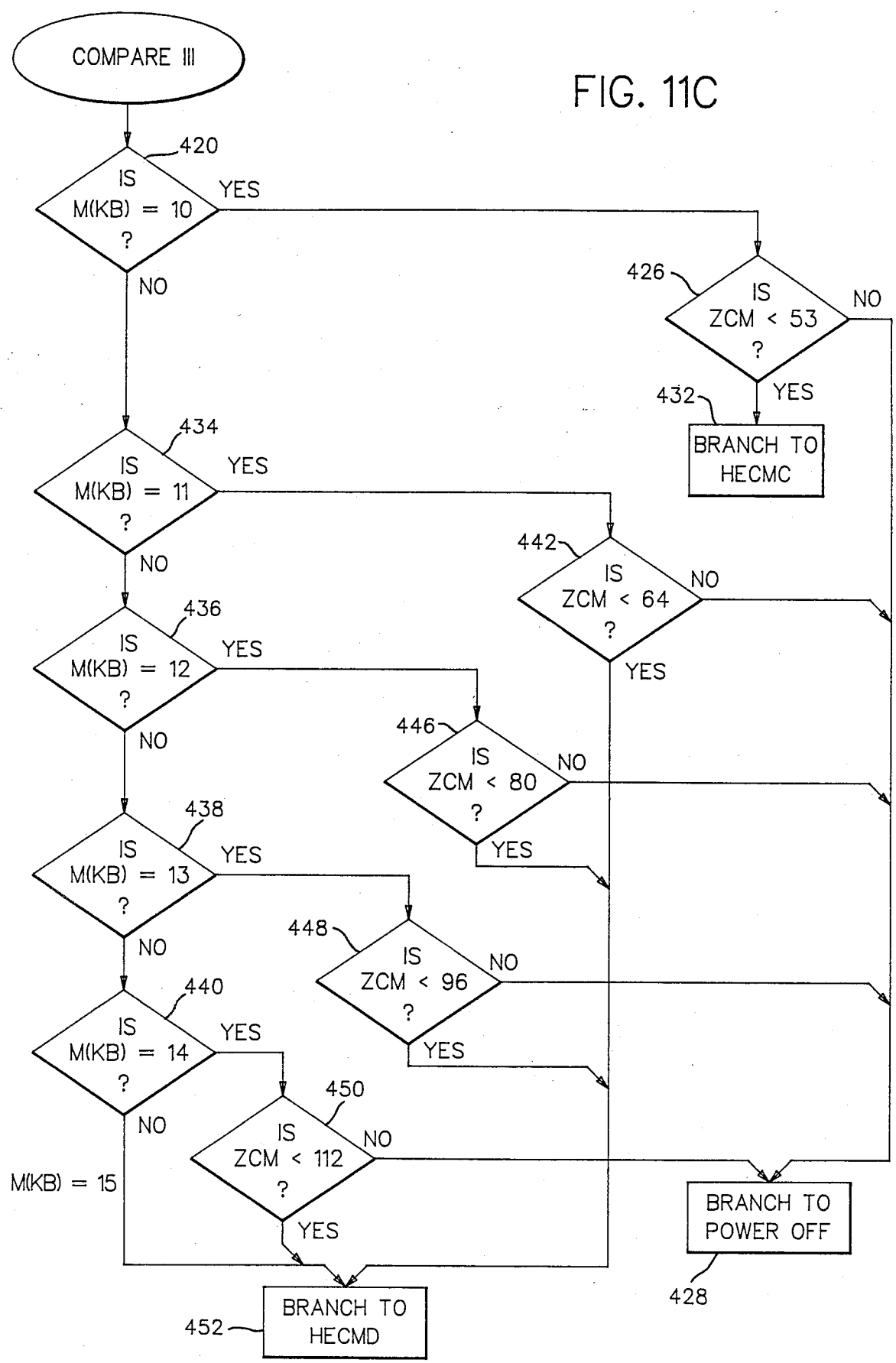

FAULT DETECT Routine—FIG. 10

This routine performs the function of means responsive to the heater energy counter for detecting an abnormal operating condition for the temperature sensing means when the count of the heater energy counter is within its predetermined reference range and the sensed utensil temperature is outside the correlative reference temperature range.

A flag designated the FLTFLG flag is used in this routine to signify that an abnormal condition, either a short circuit or open circuit failure, has been detected. Once this flag is set it remains set. It is only reset during the next power up of the system. By this arrangement, once a fault has been detected, the diagnostic signal will continue to be generated and the unit will continue to be deenergized until power is removed from the system and it subsequently goes through the power up routine, such as would occur following service of the unit.

Referring now to the flow diagram of FIG. 10, the variable TC is assigned a value representing the sensed utensil temperature in the Temp Input routine. The variable HEC represents the count of the heater energy counter. Inquiry 364 determines if the count of the heater energy counter (HEC) is greater than the high reference count (HRC) which in the illustrative embodiment is set at 6 K. If it is, no further diagnostic steps are taken and the program branches to the Power Compare routine (Block 366). If the count is less than the high reference count, the sensed utensil temperature TC is compared to the high diagnostic reference temperature (HRT) which in the illustrative embodiment is set at 488° F. at Inquiry 368. If the temperature is greater than the reference, output port R8 is set (Block 370), thereby energizing LED 120 (FIG. 5) to generate a user discernible signal that a short circuit failure has been detected. If the sensed utensil temperature is not greater than the high reference temperature, the heater energy count is compared to the low reference count (LRC) at Inquiry 372. In the illustrative embodiment LRC is set at 3 K. If the count is less than the low reference count, the program branches to the Power Compare routine. If the count is not less than the low reference count, the sensed utensil temperature is compared to the low reference temperature (LRT) set at 90° F. (Inquiry 374). If less than the low reference temperature, output port R9 is set (Block 376), thereby energizing LED 122 (FIG. 5) signifying detection of an open circuit failure of the sensor circuit. If temperature is not less than the low reference temperature, the program branches to the Power Compare routine. Upon detection of an abnormal condition and the setting of the appropriate one of output ports R8 and R9, the fault flag FLTFLG is set (Block 378). M(KB) is set equal to 0 (Block 380), thereby causing the heating unit to be deenergized by implementing the OFF power setting, beginning with the next control interval, and the program branches to the Power Compare routine.

POWER COMPARE Routine—FIGS. 11A-11C

This routine determines during each control interval whether or not the heating unit is to be energized for the ensuing control interval. This is done by comparing the count of the Master Counter (ZCM) to a number corresponding to the number of control intervals for which the heating unit is energized per control period for the power level to be appied represented by the variable M(KB). For units 14-18, M(KB) equals KB which is determined by the user selected power setting. For unit 12, the automatic unit M(KB) is established by the Temp Control routines as a function of the user selected setting and the sensed utensil temperature. Referring now to the flow diagram of FIG. 11A, for M(KB)=0 representing the OFF power level, Inquiry 381 directs the program to the Counter Decrementing Routine HECDL (Block 382) to appropriately decrement the Heater Energy Counter. For M(KB) representing power level settings of 1-4, (Inquiries 383-388), the ZCM count is compared to reference counts 3, 4, 7 and 10, respectively (Inquiries 390-396). If the power level selected is one of levels 1-4 and the ZCM count is less than the reference corresponding to that power level, the heating unit will be energized during the ensuing control interval and the program branches (Block 398) to the Heater Energy Counter Routine, entry point HECMA (FIG. 12), to appropriately increment the Energy Counter. If the ZCM count is not less than the corresponding reference value of the selected power level, the program branches (Block 400) to the Power Out routine at entry point POWER OFF (FIG. 13). If the selected power level is not one of levels 1-4, the program continues (FIG. 11B).

Referring now to FIG. 11B, Inquiries 402, 404, and 406 determine whether the selected power level is level 5, 6, or 7, respectively. The corresponding reference values for these power levels are 14, 18 and 26, respectively. If the selected power level is one of 5, 6, or 7 and the ZCM count is less than the corresponding reference value as determined by Inquiries 408-412, respectively, the heating element will be energized during the ensuing control interval, and the program branches (Block 414) to the Heater Energy Compare routine, entry point HECMB (FIG. 12) to appropriately increment the Heater Energy Counter. If one of these power levels is selected but the count is greater than the corresponding reference value, the heating unit will not be energized during the ensuing control interval and the program branches (Block 415) to the Power Out routine at entry point POWER OFF (FIG. 13).

Inquiries 416, 418 (FIG. 11B) and 420 (FIG. 11C) determine whether power levels 8, 9 and 10 have been selected, respectively. The reference values associated with these power levels are 33, 42 and 53, respectively. If the ZCM count is less than the reference value corresponding to the selected power level, as determined by Inquiries 22, 424 (FIG. 11B and 426 (FIG. 11C), the heating unit will be energized during the ensuing control interval, and the program branches (Block 430 (FIG. 11B) for Inquiries 422 and 424; Block 432 for Inquiry 26 (FIG. 11C) to the Heater Energy Compare Routine at entry point HECMC (FIG. 12) to increment the Heater Energy Counter at the appropriate rate. If one of these levels is selected but the ZCM count is greater than the reference value, the program branches (Block 415 for Inquiries 422 and 424 (FIG. 11B) and Block 428 for Inquiry 426 (FIG. 11C)) to the Power Out routine at entry point POWER OFF (FIG. 13). Finally, Inquiries 434, 436, 438 and 440 determine whether power level 11, 12, 13, or 14 has been selected, respectively; corresponding reference values are 64, 80, 96, and 112, respectively. If the ZCM count is less than the corresponding reference value as determined by Inquiries 442–450 for one of the selected power levels, the heating element will be energized during the ensuing control interval; and the program branches (Block 452) to the Heater Energy Compare Routine at entry point HECMD (FIG. 12) to increment the Heater Energy Counter. Additionally, if the answer to Inquiry 440 is No, the selection must represent power level 15, which is the maximum power level for which the heating element is energized for every control interval, and the program branches (Block 452) to Heater Energy Compare Routine at entry point HECMD (FIG. 12). If one of levels 11–14 is selected and the ZCM count is greater than or equal to the reference value, the program branches (Block 428) to the Power Out routine at entry point POWER OFF (FIG. 13).

Figure 12A:
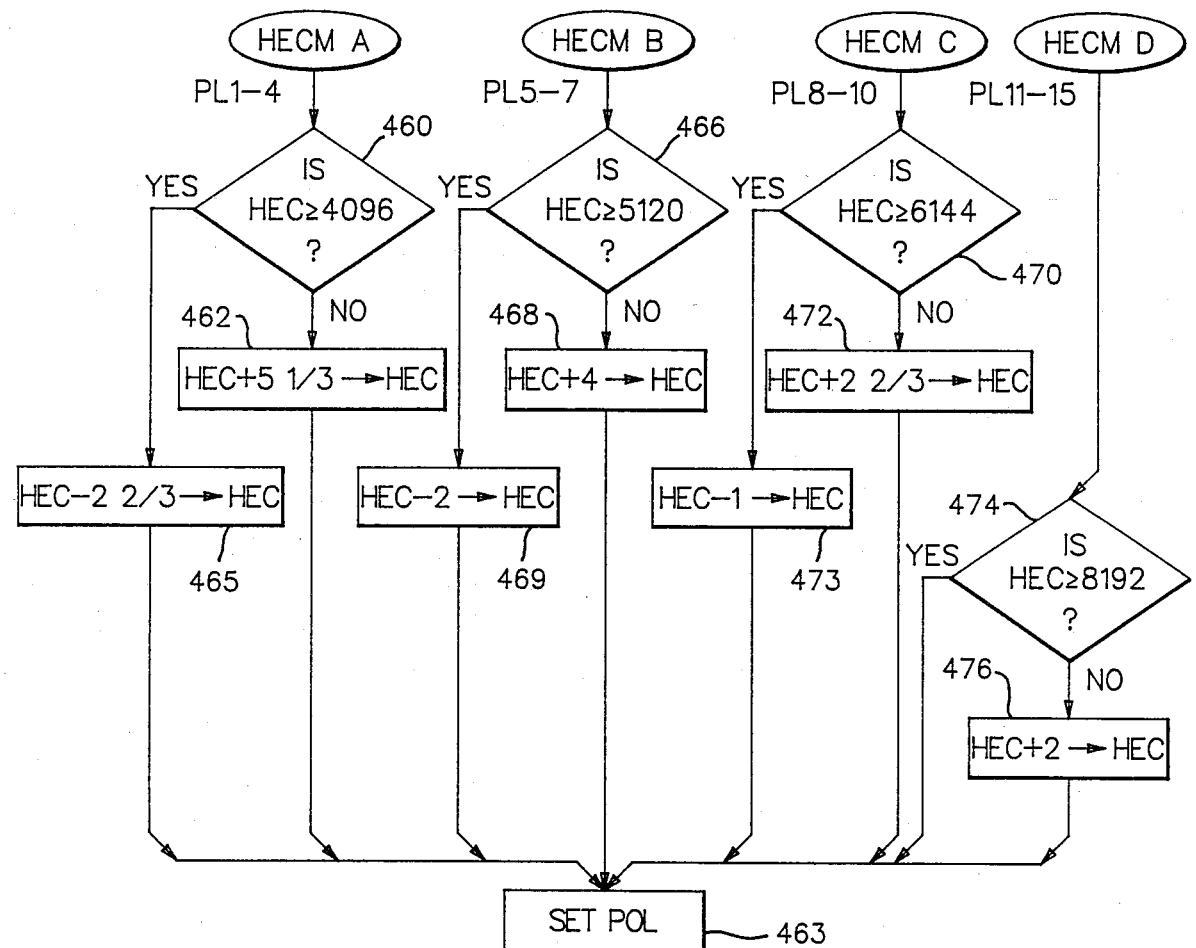
FIGS. 12A and 12B are flow diagrams of the HEC Control routine incorporated in the control program of the microprocessor in the circuit of FIG. 5.
Figure 12B:
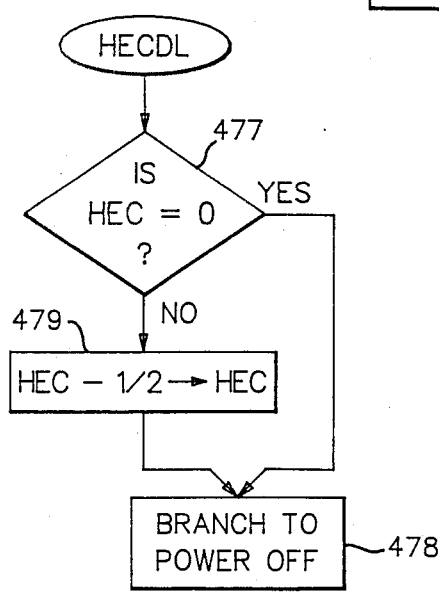
Figure 13:
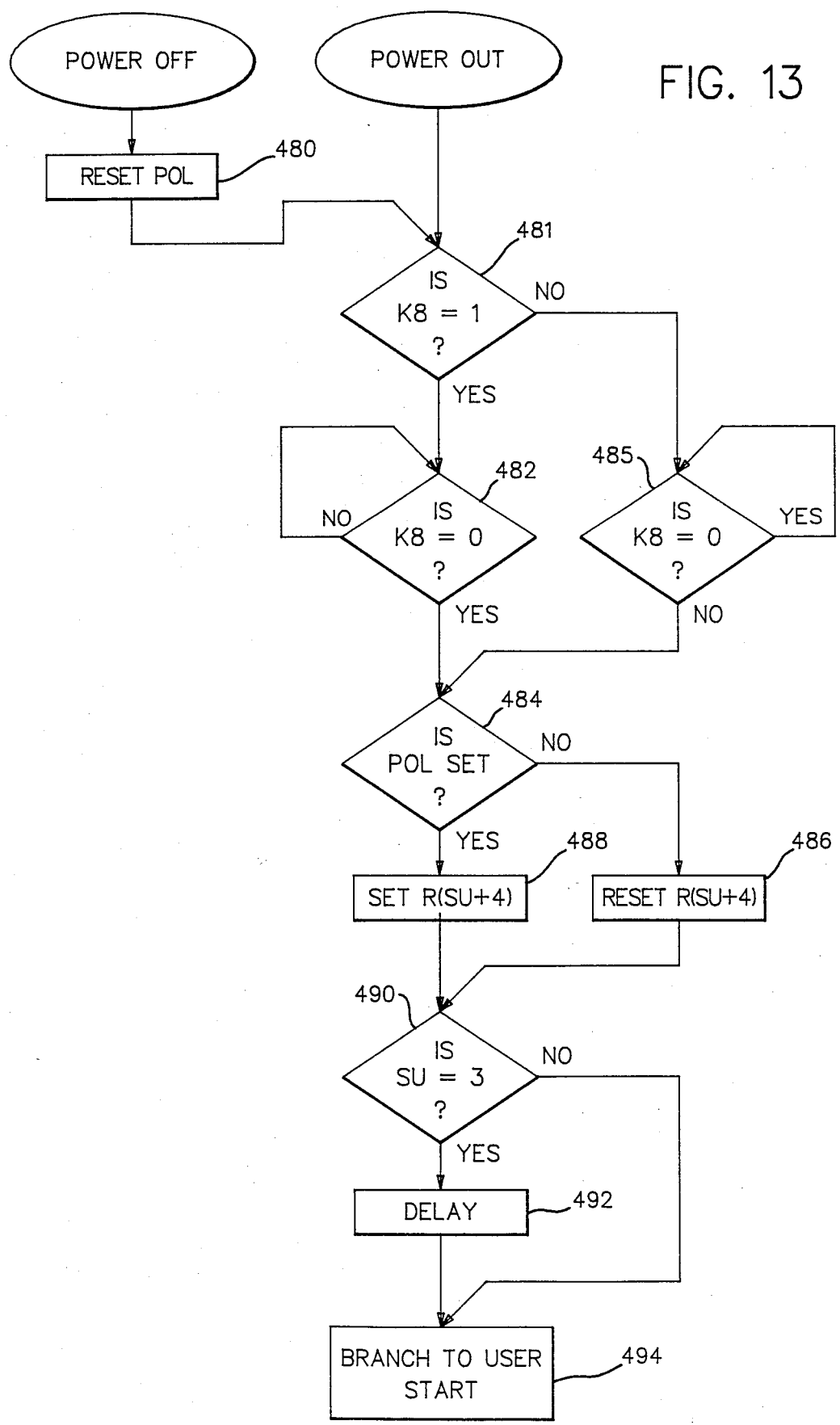
FIG. 13 is a flow diagram of the POWER OUT routine incorporated in the control program of the microprocessor in the circuit of FIG. 5.

HEATER ENERGY COMPARE Routine—FIGS. 12A and 12B

The function of this routine is to increment the Heater Energy Counter at the rate associated with the power level at which the heating element is operating when the count is less than the maximum count for that selected level to discontinue the incrementing of the Heater Energy Counter when the maximum count for the selected level is reached and to decrement the Heater Energy Counter when a change in power setting from a relatively high setting to a relatively low setting or OFF occurs, if the count of the Heater Energy Counter is greater than the maximum count associated with the newly selected power level, and at a rate which approximates the rate of temperature decrease when the heating element cools down to the steady state temperature associated with the selected lower power setting from the operating temperature associated with the previously selected relatively higher power setting.

When the heating element is to be energized during the next control interval as determined by the Power Compare Routine hereinbefore described, this routine is entered at one of points HECMA-HECMD, depending upon the power level at which the heating element is operating. When the routine is entered at one of these points, the Heater Energy Counter is incremented or decremented the appropriate number of counts and the Power Out Latch POL is set. When the POL is set a signal will be generated at R4 at the beginning of the next control interval for heating unit 12 to hold contacts RL1(a) and RL1(b) closed for the duration of that control interval. This routine is only entered at one of points HECMA-HECMD, and thus the Heater Energy Counter is only incremented and decremented for non-OFF settings when the Power Compare Routine determines that the heating element is to be energized during the next control interval.

If one of power levels 1–4 has been selected, this routine is entered at entry point HECMA. Inquiry 460 determines whether the Heater Energy Counter has reached the maximum count for these four settings for 4096. If the count is less than this maximum count, this indicates that the heating element is still heating up, and the Heater Energy Counter is incremented 5⅓ counts (Block 462) and the Power On Latch (POL) is set (Block 463) and the program branches (Block 464) to the Power Out routine (FIG. 13). This effectively increments the HEC at rates of 16, 21⅓, 37⅓, and 53⅓ counts per control period for power settings 1–4, respectively. Setting of POL (Block 463) will close the heater control relay for the next control interval.

If the maximum count for settings 1–4 has been exceeded, this signifies that the heating element had been previously operating at a power setting higher than power setting 4, with a corresponding higher temperature, and that the Heater Energy Counter has not yet been decremented to the lower maximum count associated with power settings 1–4, which in turn signifies that the heating element is in the cool-down phase between its previous higher temperature and the lower temperature associated with the lower power setting. The Heater Energy Counter is thus decremented by 2⅔ counts (Block 465), the Power Out Latch is set (Block 463) and the program branches to the Power Out routine. This decrements the HEC at rates of 8, 10⅔, 18⅔, and 26⅔ counts per control period for power settings 1–4, respectively.

If the heating element is presenty being operated at one of levels 5–7, this routine is entered at HECMB. Inquiry 466 determines if the maximum count associated with these levels of 5120 has been reached. If not, HEC is incremented by 4 counts (Block 468) and POL is set (Block 463). This increments the HEC at the rate of 56, 72 and 104 counts per control period for settings 5, 6 and 7, respectively. If the HEC count exceeds the maximum count, again indicating heating element operation in the cool-down phase following a change from a higher power setting, the HEC is decremented by 2 counts (Block 469), the POL is set (Block 463) and the program branches to the Power Out routine. This decrements the HEC at an effective average rate of 28, 36, and 52 counts per control period for settings 5, 6 and 7, respectively.

If the heating element is operating at one of levels 8–10, this routine is entered at point HECMC. Inquiry 470 determines if the maximum count associated with these leels of 6144 has been reached. If not, the HEC is incremented by 2⅔ counts (Block 472) and the POL is set (Block 464). This increments the HEC at an effective average rate of 88, 112 and 141⅓ counts per control period for levels 8, 9 and 10, respectively. If the HEC count exceeds the maximum count, signifying operation in the cool-down phase following a change from a higher power setting, the HEC is decremented by 1 count (Block 473), the POL is set (Block 463) and the program branches to the Power Out routine. This decrements the HEC at an effective rate of 33, 42 and 53 counts per control period for power settings 8, 9 and 10, respectively.

If the heating element is being operated at one of power levels 11-15, this routine is entered at entry point HECMD. Inquiry 474 determines whether the maximum count for these power levels of 8192 has been reached. If not, the HEC is incremented by 2 (Block 476), the POL is set (Block 463) and the program branches to the Power Out routine. This increments the HEC at an effective rate of 128, 160, 192, 224 and 256 counts per control period for levels 11, 12, 13, 14 and 15, respectively. Since there are no conditions under which selection of one of these power levels requires decrementing of the HEC, if the maximum count has been reached, Block 476 is bypassed, leaving the count of the HEC unchanged . . . POL is set (Block 463) and the program branches to the Power Out routine.

If the OFF power setting is being implemented, this routine is entered at entry point HECDL (FIG. 12B) and Inquiry 477 determines whether the count of HEC is zero. If it is, the program branches (Block 478) to the Power Out Routine at entry point POWER OFF (FIG. 13). If not, the count is decremented by ½ count (Block 479). This decrements the HEC at a rate of 64 counts per control period.

POWER OUT Routine—FIG. 13

It will be recalled from the description of the Start routine (FIG. 8) that the control program is executed for each surface unit sequentially. The variable SU is the indexing variable used to control the sequence. SU equal to 0, 1, 2, and 3 identifies which of RAM file and corresponding surface units 18, 16, 14 and 12 respectively is the subject of the current pass through the program.

The function of the Power Out routine is to synchronize the firing of that one of power control triacs 82A-82D (FIG. 5) associated with the surface unit for which the control program is then executing with zero crossings of the 60 Hz AC power signal applied across L1 and L2. To this end, input port K8 receives zero crossing pulses from zero crossing detector circuit 100. Referring now to the flow diagram of FIG. 13, the program is entered at entry point POWER OFF when the surface unit will be de-energized during the next control interval, and at entry point POWER OUT if the unit will be energized during the next control interval. When entered at POWER OFF, POL is reset (Block 480). When entered at POWER OUT Block 480 is bypassed. Positive half cycles of the power signal at input port K8 are represented by a logical 1 at K8 and negative half cycles are indicated by logical 0 at K8. Inquiry 481 determines the polarity of the present power signal half cycle. If the signal is presently in a positive half cycle (K8=1), Inquiry 482 waits for the beginning of the next negative half cycle (K8=0). Upon detection of K8=0, the program proceeds to Inquiry 484. If the answer to Inquiry 480 is No, Inquiry 485 waits for the beginning of the next positive half cycle (K8=1), then proceeds to Inquiry 484.

Inquiry 484 checks the state of the power out latch (POL). If POL is reset, signifying that the corresponding surface unit is not to be energized during the next control interval, the appropriate output port identified by the index variable SU+4 (R(SU+4) identifies R4, R5, R6 and R7 for SU=0, 1, 2 and 3 respectively) is reset (Block 486); if POL is set, signifying that the corresponding surface unit is to be energized, R(SU+4) is set (Block 488).

Inquiry 490 causes the control program to return directly to the Start routine to repeat the program for the next surface unit until SU=3 signifying that execution has been completed for all four surface units. When SU=3, the program delays (Block 492) until the beginning of the next control interval. In the illustrative embodiment execution of the control program uses one half cycle of the power signal for each pass through the program. Thus, execution for all four surface units is completed in the first two cycles of the power signal. The duration of the control interval is 8 cycles of the power signal. Block 492 delays the program for 6 power signal cycles, after which the program branches (Block 494) to Start to begin execution for the next control interval.

While in accordance with the Patent Statutes, specific embodiments of the present invention have been illustrated and described herein, it is realized that numerous modifications and changes will occur to those skilled in the art. For example, in the illustrative embodiment the temperature sensor monitors the temperature of the utensil being heated. However, sensors may be employed in combination with heating devices as temperature limiters to protect the support surface or the heating unit itself from overheating rather than for temperature control per se. In such applications the load temperature being monitored may be the temperature of the support surface for the object being heated or the temperature of the heating unit itself. The failure detection arrangement of the present invention is readily adaptable to detect sensor failures in such protective arrangements as well. It is therefore to be understood that the appended claims are intended to cover all such modifications and changes as fall within the true spirit and scope of the invention.

What is claimed is:

1. In a temperature controlled heating device of the type having heater means, control means for controlling the power level applied to the heater means and temperature sensing means for sensing the temperature of a load heated by the heater means, an improved temperature sensor failure detection arrangement wherein:

said control means includes heater energy counter means, means for incrementing and decrementing said heater energy counter means at rates determined as a function of the power level applied to the heater means such that the count of said heater energy counter approximately tracks the temperature of the heater means, and means responsive to the temperature sensing means and said heater energy counter means, operative to detect a first abnormal operating condition of the temperature sensing means when the count of said heater energy counter is within a predetermined reference range and the sensed temperature is outside a correlative predetermined reference temperature range.

2. The improved sensor failure detection arrangement of claim 1 further comprising means for generating a user discernible signal upon detection of said abnormal condition.

3. The improved sensor failure detection arrangement of claim 2 wherein said reference count range is bounded by predetermined maximum and minimum diagnostic reference counts and said reference temperature range is bounded by correlative predetermined maximum and minimum diagnostic reference temperatures and said means for detecting an abnormal condition is operative to detect a first abnormal condition when the count of the heater energy count is less than said maximum diagnostic reference count and the sensed temperature is greater than said predetermined maximum diagnostic reference temperature and to detect a second fault condition when the count of the heater energy counter is greater than said predetermined minimum diagnostic reference count and the sensed utensil temperature is less than said predetermined minimum reference diagnostic temperature.

4. In a temperature controlled heating device of the type having heater means, control means for controlling the power level applied to the heater means and temperature sensing means for sensing the temperature of a load heated by the heater means, an improved temperature sensor failure detection arrangement wherein:

said control means includes heater energy counter means, means for incrementing and decrementing said heater energy counter means at rates determined as a function of the power level applied to the heater means such that the count of said heater energy counter approximately tracks the temperature of the heater means, and means responsive to the temperature sensing means and said heater energy counter means, operative to detect a first abnormal operating condition of the temperature sensing means when the count of said heater energy counter is less than a predetermined diagnostic reference count and the sensed temperature is greater than a correlative predetermined diagnostic reference temperature.

5. The improved sensor failure detection arrangement of claim 4 further comprising means for generating a user discernible signal upon detection of said abnormal condition.

6. In a cooking appliance of the type having heater means for heating a cooking utensil, user input selection means for enabling the user to select the desired heating level for the heater means, temperature sensing means operative to sense the temperature of the utensil being heated by the heater means, heater energy counter means for approximately tracking the heater means temperature and counter control means for selectively incrementing and decrementing the energy counter at rates such that the count of the heater energy counter is approximately proportional to the temperature of the heater means, and control means responsive to the user input selection means and the temperature sensing means, operative to apply a power level to the heater means as a function of the sensed temperature and the user selected heating level, an improved fault detection arrangement for detecting a failure of the temperature sensing means wherein:

said control means further comprises means responsive to the heater energy counter for detecting an abnormal operating condition for the temperature sensing means when the count of the heater energy counter is within a predetermined reference range and the sensed utensil temperature is outside a correlative predetermined reference temperature range; and said arrangement further comprising means operative to generate a user discernible signal upon detection of said abnormal condition.

7. The improvement of claim 6 wherein said reference count range is bounded by predetermined maximum and minimum diagnostic reference counts and said reference temperature range is bounded by correlative predetermined maximum and minimum diagnostic reference temperatures and said means for detecting an abnormal condition is operative to detect a first abnormal condition when the count of the heater energy count is less than said maximum diagnostic reference count and the sensed temperature is greater than said predetermined maximum diagnostic reference temperature and to detect a second fault condition when the count of the heater energy counter is greater than said predetermined minimum diagnostic reference count and the sensed utensil temperature is less than said predetermined minimum reference diagnostic temperature.

8. The improvement of claim 7 wherein said temperature sensing means comprises a negative temperature coefficient thermistor and wherein said first abnormal operating condition comprises a short circuit fault condition for said thermistor, and said second abnormal operating condition comprises an open circuit fault condition for said thermistor.

9. In a cooking appliance of the type having heater means for heating a cooking utensil, user input selection means for enabling the user to select the desired heating level for the heater means, temperature sensing means operative to sense the temperature of the utensil being heated by the heater means, heater energy counter means for approximately tracking the heating element temperature and counter control means for selectively incrementing and decrementing the energy counter at rates such that the count of the heater energy counter is approximately proportional to the temperature of the heating element, and control means responsive to the user input selection means and the temperature sensing means, operative under normal conditions to apply a power level to the heater means determined as a function of the user selected heating level and the sensed temperature, an improved fault detection arrangement for detecting a failure of the temperature sensing means wherein:

said control means further comprises means responsive to the heater energy counter means and the temperature sensing means operative to detect an abnormal operating condition of the temperature sensing means when the count of the heater energy counter is less than a predetermined diagnostic reference count and the sensed temperature is greater than a correlative predetermined diagnostic reference temperature., said arrangement further comprising user discernible signal means responsive to said control means and operative to generate a user discernible signal in response to detection by said control means of said abnormal operating condition of said sensor means.

10. In a cooking appliance of the type having heater means for heating a cooking utensil, user input selection means for enabling the user to select the desired heating level for the heater means, temperature sensing means operative to sense the temperature of the utensil being heated by the heater means, heater energy counter means for approximately tracking thettemperature of the heating means and counter control means for selectively incrementing and decrementing the energy counter at rates such that the count of the heater energy counter is approximately proportional to the temperature of the heating means and control means responsive to the user input selection means and the temperature sensing means operative to apply a power level to the heating means as a function of the sensed temperature and the user selected heating level, a method of detecting a failure of the temperature sensing means comprising the steps of:

- periodically comparing the count of the heater energy counter to a predetermined maximum reference count indicative of heater means operation at a relatively high temperature;
- upon detection of a heater energy count less than said maximum reference count, comparing the sensed utensil temperature to a maximum reference diagnostic temperature;
- if the sensed temperature is less than the maximum reference temperature, comparing the heater energy count to a minimum reference count representative of operation of a heater means at a relatively low temperature;
- if the count is greater than said minimum reference count, comparing the sensed utensil temperature to a minimum diagnostic reference temperature representative of a utensil temperature less than a normal steady state operating temperature for a utensil operating at the lowest available power level for the heating means;
- detecting an abnormal operating condition for the sensor means if the sensed temperature is greater than the maximum reference temperature or less than the minimum diagnostic reference temperature;
- upon detection of the abnormal operating condition, generating a user discernible signal indicative thereof.

* * * * *